(12) United States Patent
Abe et al.

(10) Patent No.: US 7,035,775 B2
(45) Date of Patent: Apr. 25, 2006

(54) SIMILAR TIME SERIES DETECTION METHOD AND APPARATUS, PROGRAM AND RECORDING MEDIUM

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 383 days.

(21) Appl. No.: 10/613,789

(22) Filed: Jul. 3, 2003

(65) Prior Publication Data
US 2004/0098225 A1 May 20, 2004

(30) Foreign Application Priority Data
Jul. 9, 2002 (JP) ............... 2002-200480

(51) Int. Cl.
*G06F 19/00* (2006.01)
(52) U.S. Cl. ............................ 702/189; 702/176
(58) Field of Classification Search ................ 702/189, 702/176
See application file for complete search history.

(56) References Cited

U.S. PATENT DOCUMENTS

| | | | |
|---|---|---|---|
| 6,615,172 B1* | 9/2003 | Bennett et al. | 704/257 |
| 2003/0109951 A1* | 6/2003 | Hsiung et al. | 700/108 |
| 2003/0191764 A1* | 10/2003 | Richards | 707/100 |
| 2003/0224344 A1* | 12/2003 | Shamir et al. | 435/4 |
| 2004/0039551 A1* | 2/2004 | Daw et al. | 702/188 |
| 2005/0192758 A1* | 9/2005 | Xie | 702/19 |

* cited by examiner

*Primary Examiner*—Edward Raymond
(74) *Attorney, Agent, or Firm*—Sonnenschein, Nath & Rosenthal LLP

(57) ABSTRACT

A method, an apparatus and a program for detecting similarity between two time-domain signals, at a high speed, and a recording medium on which is recorded such program. The process for detecting the similarity is split into a stage for calculating the similarity between feature vectors at each discrete time t and a stage for counting the number of similar vectors in the entire time series. In the calculating stage, the distances between the components for the same frame numbers of the feature vector time series $g_t$, $f_t$ are hierarchically integrated. If the ultimate integrated value is lower than the distance threshold value S, the feature vector time series $g_t$, $f_t$ are determined to be similar. If the integrated value exceeds the threshold value part way in the course of the hierarchical integration, the feature vector time series $g_t$, $f_t$ are determined to be dissimilar and the integrating calculations for the remaining components are discontinued. In the counting stage, the number of the feature vectors f determined to be similar and the number D of the feature vectors f determined to be dissimilar are hierarchically counted with respect to each frame. If the ultimate number of dissimilar vectors D is smaller than the threshold value (T-U), the feature vector time series $g_t$, $f_t$ are determined to be similar. If the number of dissimilar vectors D exceeds the threshold value (T-U) part way in the integrating calculations, the feature vector time series $g_t$, $f_t$ are determined to be dissimilar and the similarity calculations for the remaining frames are discontinued.

31 Claims, 19 Drawing Sheets

NUMBER OF
SIMILAR     R=9
VECTORS

NUMBER OF
DISSIMILAR  D=3
VECTORS

REFERENCE TIME DOMAIN SIGNALS

COMPARE

INPUT TIME DOMAIN SIGNALS

US 7,035,775 B2

SIMILAR TIME SERIES DETECTION METHOD AND APPARATUS, PROGRAM AND RECORDING MEDIUM

BACKGROUND OF THE INVENTION

1. Field of the Invention

This invention relates to a method, an apparatus and a program for detecting similar time series for detecting the similarity between two time-domain signals at a high speed, and to a recording medium having such program recorded thereon.

This application claims the priority of the Japanese Patent Application No. 2002-200480 filed on Jul. 9, 2002, the entirety of which is incorporated by reference herein.

2. Description of Related Art

Up to now, such a technique which, with a view to retrieving video or audio contents, identifying broadcast commercial messages, names of the musical numbers of the broadcast music or supervising the network contents, detects the portion in unknown video or audio signals which is substantially coincident with certain video or audio signals, used as reference signals (query), has been thought to be necessary.

This task is handled as a problem in which, as shown in FIG. 18A, feature values are extracted from video or audio signals, every short time frame, and vectorized to construct feature vectors, and time domain patterns thereof are compared.

Among the methods for comparison, the so-called full search method is thought to be simplest and most universal, while being superior in reliability. This full search method consists in finding the degree of similarity to a time domain of the reference time domain signals of a partial domain in input time domain signals, matched to the time domain of the reference time domain signals, indicated by a rectangle drawn with a thick line in the drawing, by for example the correlation method or distance calculations, as shown in FIG. 18B, and sequentially executing this processing as the domain being compared is shifted by one frame at a time, as shown in FIGS. 18C and D, and detecting the signal portions, where the degree of similarity exceeds a preset threshold value, as being the coincident signal portions.

However, this full search method suffers from a problem that the calculations of the degree of similarity for a large number of components equal to the product of magnitude of the feature vectors and length of the reference time domain signals need to be carried out for the totality of the frames of the input time domain signals, resulting in considerable processing volume and retrieving time.

Thus, there is disclosed in Japanese Patent 3065314 a technique which consists in preparing a histogram of the feature values in the reference time domain signals and the corresponding location (indicated by a rectangle in thick line) in the input time domain signals and in determining the next position for comparison, that is the amount of movement of the frame in thick black line in the drawing, based on the difference, for increasing the speed of the comparison processing. Specifically, this technique resides in degrading the time axis information by preparing the histogram to eliminate the necessity for frame-by-frame comparison to speed up the processing.

However, the technique disclosed in this Japanese Patent 3065314 suffers from a problem that, since the comparison is carried out for the reduced information volume, failure in detection of the deteriorated signals or mistaken detection for different signals is produced, thus lowering the detection capability.

If, in similarity retrieval of video and audio signals, two time series are substantially coincident with each other, but different speech is superimposed on the same music, different telops are indicated on the same image, the two similar images are edited in a different manner, or one of the time series is partially deteriorated such as by frame dropout, feature vectors whose parts are completely dissimilar are inserted in basically similar video or audio signals, as shown by the shaded part in FIG. 19.

In the above-described object, that is in retrieving video or audio contents, it would be convenient if two time series with other signal components partially superposed thereon could be retrieved as being the same time series. However, the above-described conventional technique suffers from a problem that, if marked difference is present, even partially, in otherwise substantially coincident signal portions, this difference cannot be distinguished from the global difference and hence cannot be detected.

SUMMARY OF THE INVENTION

It is therefore an object of the present invention to provide a fast time series detecting method and apparatus in which similarity between two time series signals may be detected speedily, despite the presence of partially significant deterioration, without losing universality, flexibility or reliability proper to the full search method. It is another object of the present invention to provide a program for having a computer execute the high speed time series detection processing and a computer-readable recording medium having the program recorded thereon.

In one aspect, the present invention provides a method for detecting similar time series of a pair of time series patterns, with the time series patterns being time series of vectors, in which the method comprises a vector decision step of calculating the degree of similarity between a pair of vectors of the paired time series patterns and giving a decision as to whether or not the paired vectors are similar to each other, based on the degree of similarity, and a time series decision step of counting similar vectors decided to be similar and/or dissimilar vectors decided to be dissimilar in the vector decision step and giving a decision as to whether or not the paired time series patterns are similar, based on the results of the counting.

The degree of similarity is the distance between the paired vectors. The vector decision step includes a hierarchical distance calculating step of hierarchically calculating the distance between the paired vectors, a threshold value comparing step of comparing an integrated distance value calculated in each hierarchy of the hierarchical distance calculating step to a first threshold value pertinent to the distance and a decision step of determining whether or not the paired vectors are similar to each other, responsive to the results of comparison in the threshold comparing step. If, in the threshold comparing step, the integrated distance value calculated up to the last hierarchy is smaller than the first threshold value, the paired vectors are determined to be similar in the decision step. If the integrated distance value calculated up to a given hierarchy exceeds the first threshold value, the paired vectors are determined to be dissimilar, and control is performed to discontinue the distance calculations for the remaining hierarchies.

The time series decision step includes a hierarchical counting step of hierarchically counting the number of the similar vectors and/or the dissimilar vectors, a threshold value comparing step of comparing an integrated value of the similar vectors and/or the dissimilar vectors, obtained in each hierarchy of the hierarchical counting step, to a second threshold value of the number of similar vectors, and a decision step of determining the similarity of the paired time series patterns, responsive to the results of comparison in the threshold value comparing step. If, in the threshold value comparing step, the integrated value of the number of the similar vectors calculated up to the last hierarchy is larger than the second threshold value, the paired time series patterns are determined to be similar in the decision step. If the integrated value of the number of the dissimilar vectors, calculated up to a given hierarchy, exceeds the total number of the vectors in the time series pattern less the second threshold value, the paired time series patterns are determined to be dissimilar, and control is performed to discontinue the distance calculations for the remaining hierarchies.

In another aspect, the present invention also provides an apparatus for detecting similar time series of a pair of time series patterns, with the time series patterns being time series of vectors, in which the apparatus comprises a vector decision means for calculating the degree of similarity between a pair of vectors of the paired time series patterns and giving a decision as to whether or not the paired vectors are similar to each other, based on the degree of similarity, and a time series decision means for counting the number of similar vectors decided to be similar and/or dissimilar vectors decided to be dissimilar in the vector decision means and giving a decision as to whether or not the paired time series patterns are similar, based on the results of the counting.

The degree of similarity is the distance between the paired vectors. The vector decision means includes a hierarchical distance calculating means for hierarchically calculating the distance between the paired vectors, threshold value comparing means for comparing an integrated distance value calculated in each hierarchy of the hierarchical distance calculating means to a first threshold value pertinent to the distance and decision means for determining whether or not the paired vectors are similar to each other, responsive to the results of comparison in the threshold comparing means. If, in the threshold comparing means, the integrated distance value calculated up to the last hierarchy is smaller than the first threshold value, the paired vectors are determined to be similar in the decision means. If the integrated distance value calculated up to a given hierarchy exceeds the first threshold value, the paired vectors are determined to be dissimilar, and control is performed to discontinue the distance calculations for the remaining hierarchies.

The time series decision means includes hierarchical counting means for hierarchically counting the number of the similar vectors and/or the dissimilar vectors, threshold value comparing means for comparing an integrated value of the number of the similar vectors and/or the dissimilar vectors, obtained in each hierarchy of the hierarchical counting means, to a second threshold value of the number of similar vectors, and decision means for determining the similarity of the paired time series patterns, responsive to the results of comparison in the threshold value comparing means. If, in the threshold value comparing means, the integrated value of the number of the similar vectors calculated up to the last hierarchy is larger than the second threshold value, the decision means determines the paired time series patterns to be similar. If the integrated value of the number of the dissimilar vectors, calculated up to a given hierarchy, exceeds the total number of the vectors in the time series pattern less the second threshold value, the decision means determines the paired time series patterns to be dissimilar, and control is performed to discontinue the distance calculations for the remaining hierarchies.

In the method and apparatus for detecting the similar time series, described above, the process of detecting the similarity of paired time series patterns is split into a stage of calculating the distance between the vectors making up the paired time series patterns and a stage of counting the number of the similar and dissimilar vectors of the entire time series.

In the distance calculating stage, the distance, for example, is hierarchically calculated, as indicating the degree of similarity between the vectors making up the paired time series patterns. When the integrated distance value, obtained up to a certain hierarchy, has exceeded a threshold value, the two time series patterns are determined to be dissimilar to discontinue the distance calculations for the remaining hierarchies to speed up the calculations.

In the counting stage, when the integrated value of the numbers of the dissimilar vectors, obtained up to a certain hierarchy, has exceeded a certain allowable value, the two time series patterns are determined to be dissimilar to discontinue the counting for the remaining hierarchies, in order to speed up the calculations.

The program according to the present invention allows a computer to execute the processing of detecting the similar time series as described above. The recording medium according to the present invention is computer readable and has the above program recorded thereon.

With the program or the recording medium, the above-described processing for detecting the similar time series may be implemented by software.

DESCRIPTION OF THE PREFERRED EMBODIMENTS

Figure 1A:
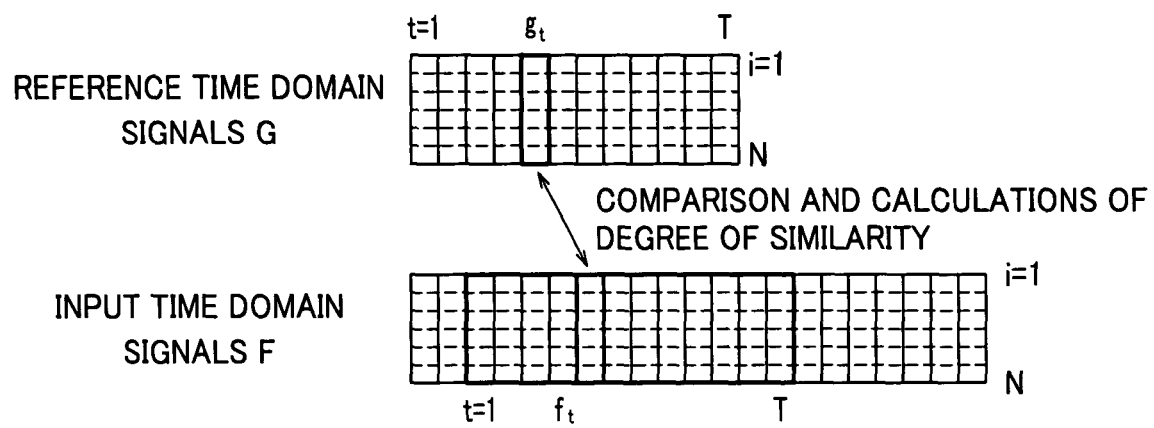
FIGS. 1A and 1B illustrate the concept of the present embodiment, FIG. 1A illustrating the stage of calculating the degree of similarity between feature vectors and FIG. 1B illustrating the stage of counting the number of similar feature vectors.

Referring to the drawings, preferred embodiments of the present invention will be explained in detail. In these embodiments, the present invention is applied to an analogous time series retrieving method and apparatus for retrieving a signal position of unknown time domain signals which is coincident with pre-registered reference time domain signals. It is to be noted that the present invention is not limited to the embodiments illustrated and can be applied to detecting similarity between any optional two time domain signals.

(1) Basic Concept of the Present Embodiment

In the present specification, the time series of feature vectors f and g, obtained from the input time domain signals F and the reference time domain signals G, as the subject matter of comparison, are depicted as feature vector time series $f_t$ and $g_t$, respectively, where t is a suffix representing the discrete time (frame numbers). The number of frames of the reference time domain signals is T. The i-th components of the feature vectors f and g in the t-th frames of the input time domain signals F and the reference time domain signals G are depicted as $f_t[i]$ and $g_t[i]$, respectively. The number of dimensions of the feature vector is depicted as N.

In the full search method, the time series patterns are compared in their entirety for similarity detection therebetween. However, in the present embodiment, the process for similarity detection is divided into a stage for calculating the degree of similarity between feature vectors in each discrete time t and a stage of counting the number of analogous feature vectors of the entire time series, and a threshold value is provided for each stage to speed up the retrieval processing.

In the stage for calculating the degree of similarity between feature vectors, the feature vector time series $g_t$ of the reference time domain signals G and the feature vector time series $f_t$ in the input time domain signals F, indicated by bold rectangles in the drawing, as the subject matter of comparison, are compared to each other, as shown in FIG. 1A, in a manner which will be explained subsequently in detail. Briefly, the distances between respective components in the same frame numbers of the feature vector time series $g_t$ and $f_t$ are hierarchically sequentially integrated, and, if the ultimate integrated value of a frame in question is lower than a distance threshold value S, the two time series are determined to be similar. If, in a certain hierarchy in the course of the integration, the integrated value is larger than the threshold value S, the two time series are determined to be dissimilar and the integration between the remaining components of the frames is discontinued.

Figure 1B:
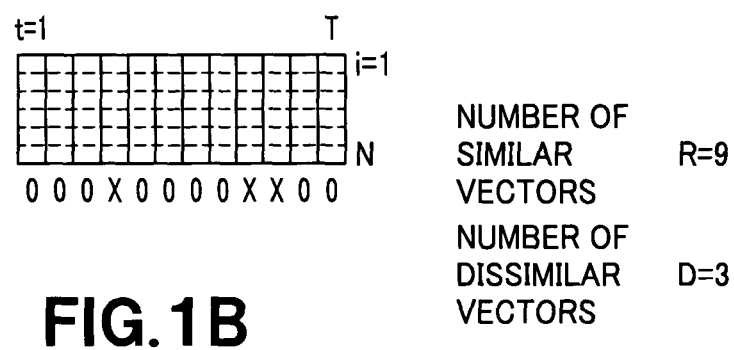

On the other hand, in the stage of counting the number of analogous feature vectors, the number R of the feature vectors f, determined to be similar, as indicated by "0" in the drawing, and the number D of the feature vectors f, determined to be dissimilar, as indicated by "X" in the drawing, are hierarchically counted from frame to frame. If, at a stage when the comparison has proceeded to the T-th frame, the number of dissimilar feature vectors D is smaller than a threshold value (T-U), the feature vector time series $g_t$ are determined to be similar to the feature vector time $f_t$, as shown in FIG. 1B. If, in a certain hierarchy in the course of the integration, the number of the dissimilar feature vectors is larger than the threshold value (T-U), the feature vector time series $g_t$ and the feature vector time series $f_t$ are determined to be dissimilar and the similarity calculations for the remaining frames is discontinued.

In the present embodiment, the above-described processing is sequentially executed as the partial domains in the input time domain signals F are shifted frame by frame, whereby the signal positions coincident with the reference time domain signals G can be speedily retrieved from the input time domain signals F.

For example, if the number of dimensions of the feature vectors N is 256, the number of frames T is 32 and those signal portions substantially completely coincident with the reference time domain signals are to be retrieved, approximately 8192 product—sum operations are needed per comparison operation in the conventional full search method. In the present embodiment, if the threshold value U of 32, that is complete coincidence, is set, the non-coincident signal portions are discarded by the comparison stage for one frame in the least, thus enabling high speed processing. Also, at the comparison stage for each frame, the non-coincident signal portions are discarded by one integrating operation in the least by setting a threshold value S, thus enabling high speed processing. In particular, in the majority of the retrieving tasks, coincident target signal portions are only few, such that the majority of the comparison operations are carried out to confirm the non-coincidence, thus the retrieving time can be shortened appreciably.

In the conventional full search method, if the input time domain signals F being retrieved are similar to the reference time domain signals, but if totally different signals have been inserted in a partial domain of the input time domain signals, similarity detection is impossible, because the degree of similarity (distance) between the feature vectors of the partial domain of the input time domain signals and those of the corresponding domain of the reference time domain signals directly influences the similarity of the entire time series. Conversely, with the present embodiment, the entire time series are compared based only on whether or not the frame-based vectors are similar. Thus, even if totally different signals are inserted into partial domains of the input time domain signals F analogous with the reference time domain signals, these different signals may be made innocuous, by properly setting the aforementioned threshold value U, thus allowing similarity detection. Meanwhile, the decision is given based only on the ratio of the number of coincidences/number of non-coincidences, that is on the ratio of allowing for non-coincidence in the global time series, and hence it is unnecessary to grasp the position of non-coincidence at the outset.

(2) Structure and Operation of the Similar Time series Retrieving Apparatus

Figure 2:
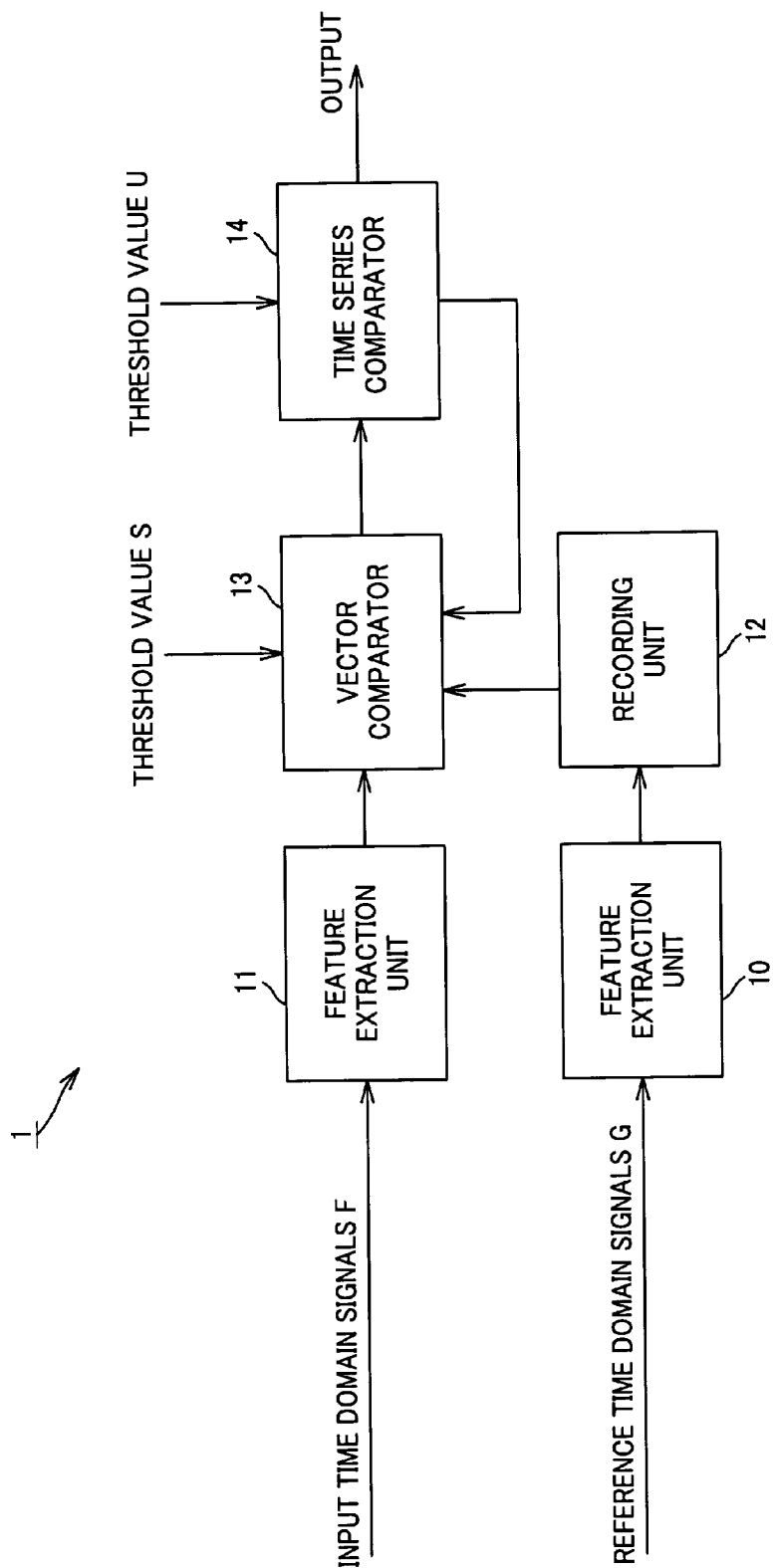
FIG. 2 illustrates the schematic structure of a similar signal detecting apparatus of the present embodiment.

FIG. 2 shows the schematic structure of a similar time series retrieving apparatus of the present embodiment performing the above-described processing operations. Referring to FIG. 2, a similar time series retrieving apparatus 1 is supplied with the input time domain signals F and with the reference time domain signals G to detect signal positions similar to the reference time domain signals G in the input time domain signals F, and is made up by feature extraction units 10, 11, a recording unit 12, a vector comparator 13 and a time series comparator 14, as shown in FIG. 2. The feature extraction units 10, 11 perform similar processing operations on the reference time domain signals G and the input time domain signals F, respectively. The recording unit 12 is e.g. a magnetic disc, an optical disc or a semiconductor memory.

Figure 3:
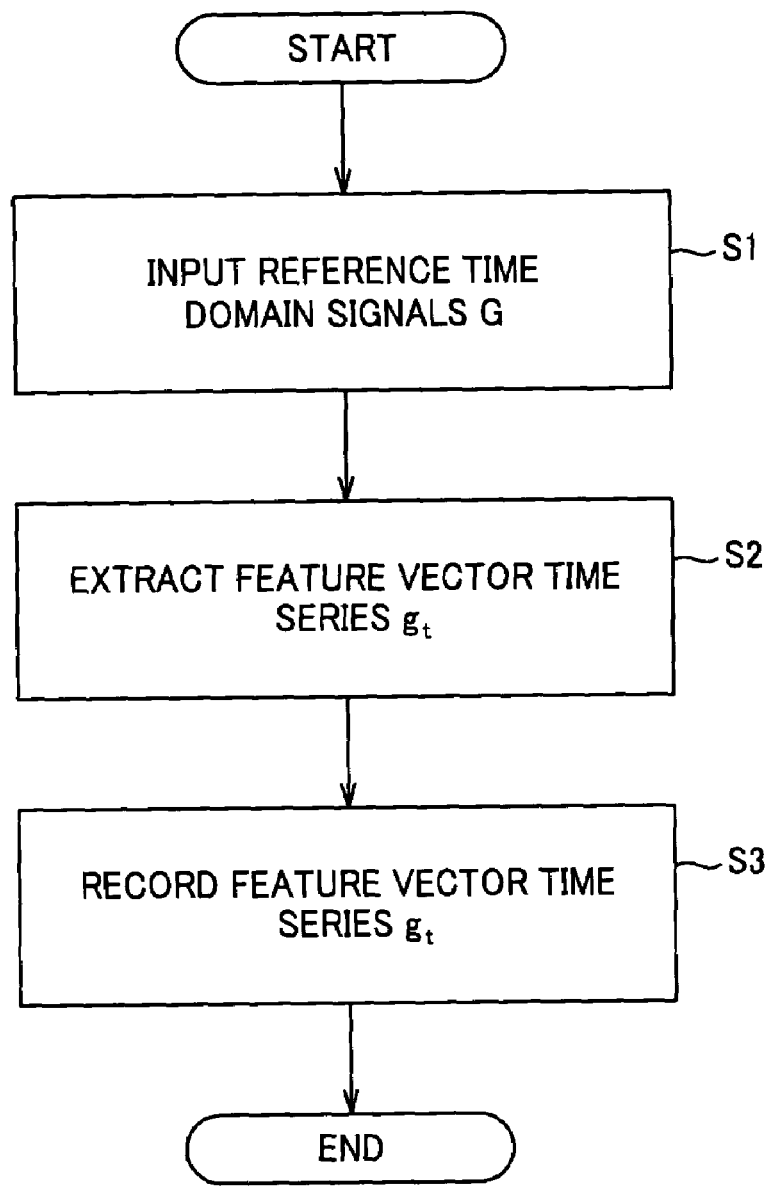
FIG. 3 is a flowchart for illustrating the processing in registration in the similar signal detecting apparatus.

The processing of the similar time series retrieving apparatus 1 in registering the reference time domain signals G is now explained by referring to the flowchart of FIG. 3. First, in a step S1, the feature extraction unit 10 (FIG. 2) is supplied at the outset with the reference time domain signals G to be registered. In the next step S2, the feature extraction unit 10 extracts and vectorizes the feature values of the reference time domain signals G. The feature extraction unit 10 sequentially executes this processing, in terms of a proper time frame as a unit, in order to generate feature vector time series $g_r$. The feature vector extraction processing in this feature extraction unit 10 will be explained subsequently in detail. In the next step S3, the recording unit 12 records the feature vector time series $g_r$.

Thus, the present embodiment is simplified because only the processing of extracting and recording the feature vectors is executed at the time of registration, and hence is suited for processing in real-time. Moreover, the registration or deletion of the reference time domain signals G is facilitated because there is no necessity for interchanging the chronological sequence at the time of registration or formulating an index using the totality of data.

Figure 4:
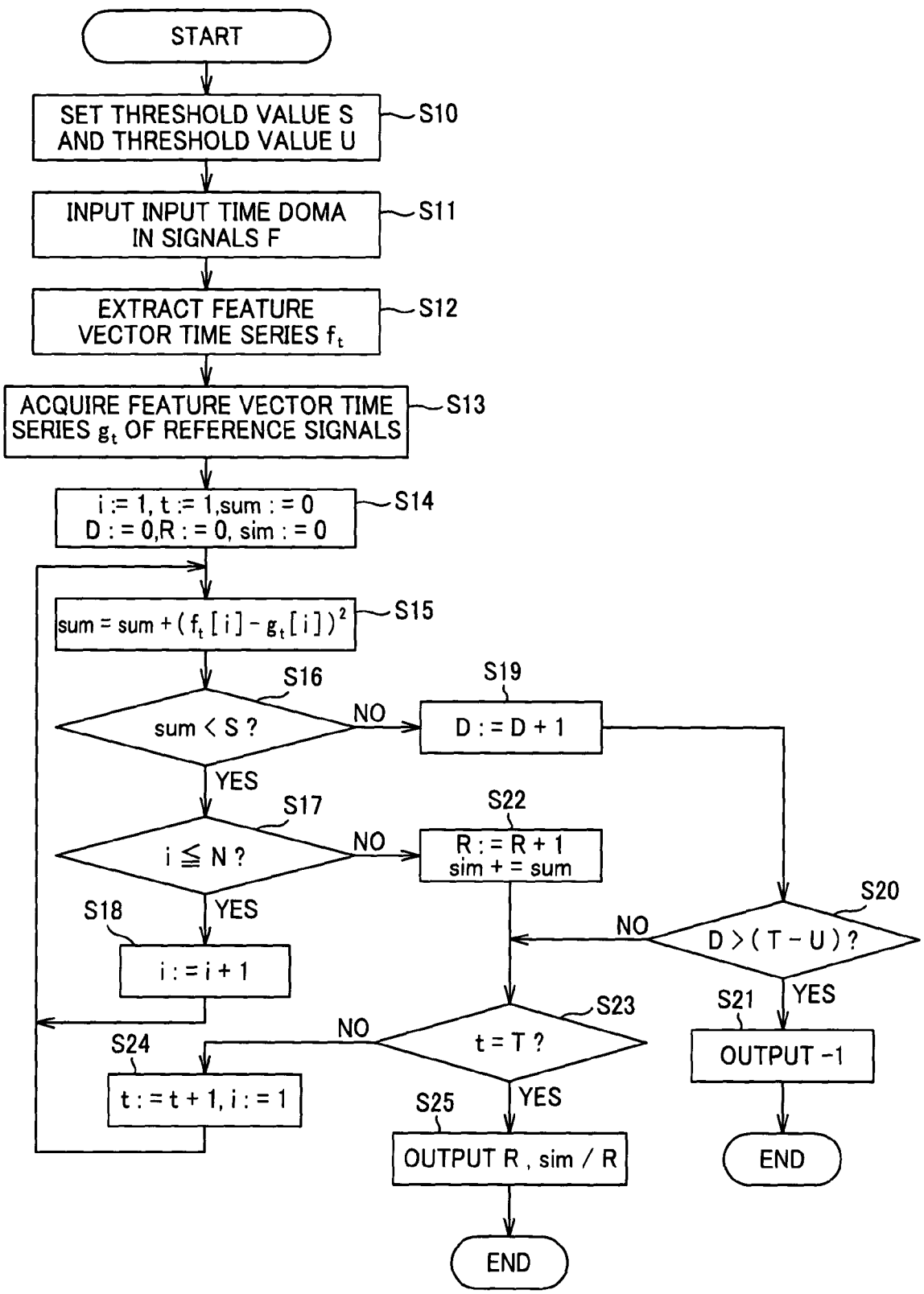
FIG. 4 is a flowchart for illustrating the processing in retrieval in the similar signal detecting apparatus.

The processing at the time of retrieval in the similar time series retrieving apparatus 1 is now explained by referring to the flowchart of FIG. 4. First, in a step S10, the vector comparator 13 (FIG. 2) and the time series comparator 14 set a threshold value S of the distance between the respective vectors and a threshold value U of the number of similar vectors.

In the next step S11, the feature extraction unit 11 is supplied with the input time domain signals F. In the next step S12, the feature extraction unit 11 extracts and vectorizes the feature values of the reference time domain signals F. The feature extraction unit 11 sequentially executes this processing, in terms of a suitable time frame as a unit, in order to generate a feature vector time series $f_t$. The processing for extracting the feature vectors by the feature extraction unit 11 will be explained in detail subsequently.

In the next step S13, the vector comparator 13 acquires one feature vector time series $g_r$ recorded in the recording unit 12.

In a step S14, the vector comparator 13 initializes a component number i, discrete time t and an integrated distance sum between the vector components, which are internal variables, while the time series comparator 14 initializes the number of similar vectors R, the number of dissimilar vectors D and an integrated distance sim between respective vectors (integrated value being the sum), which are internal variables. That is, the vector comparator 13 sets the component number i and the discrete time t to 1, while setting the integrated value sum to 0. The time series comparator 14 sets the number of similar vectors R, the number of dissimilar vectors D and the integrated distance sim to 0.

In a step S15, the vector comparator 13 performs the integrating operation on the i-th component $f_t[i]$ of the feature vector time series $f_t$ and the i-th component $g_r[i]$ of the feature vector time series $g_r$ in the t-th frame, as shown by the following equation (1):

$$\text{sum} = \text{sum} + (f_t[i] - g_r[i])^2 \quad (1).$$

In the step S16, the vector comparator 13 verifies whether or not the integrated value sum is less than the threshold value S. If the integrated value sum is less than the threshold value S (YES), processing transfers to a step S17.

In the step S17, it is checked whether or not the component number i is equal to or less than the number of dimensions N of the feature vectors f and g. If the component number i is less than N (YES), the vector comparator 13 increments the component number i in a step S18 to then revert to the step S15. If the component number i is not less than N (NO), the integrating operation is terminated up to the last component of the feature vectors f and g, and hence the feature vectors compared are verified to be similar to each other. So, the time series comparator 14 in a step S22 increments the number of similar vectors R and integrates the integrated value sum to the integrated value sim. The integrated value sum at this time is the square of the vector-to-vector distance.

If, in the step S16, the integrated value sum is equal to or larger than the threshold value S (NO), the feature vectors compared are verified to be dissimilar to each other. So, the operations of integrating the remaining components are omitted and processing transfers to a step S19. In this manner, the vector comparator 13 sets the threshold value S and, when the integrated value sum exceeds the threshold value S part way during the integrating operation, the vector comparator 13 discontinues the integrating operation to accelerate the processing.

In the step S19, the time series comparator 14 increments the number of dissimilar vectors D. In the step S20, the time series comparator 14 checks whether or not the number of dissimilar vectors D has exceeded the threshold value (T-U). If the number of dissimilar vectors D has exceeded the threshold value (T-U) (YES), the time series comparator 14 in the step S21 outputs −1 to terminate the processing. This output value −1 is optionally set to indicate that the feature vector time series $f_t$ has been found to be dissimilar to the feature vector time series $g_r$. If the number of dissimilar vectors D is not larger than the threshold value (T-U) (NO), processing transfers to a step S23. In this manner, the time series comparator 14 sets the threshold value U and, when the number of dissimilar vectors D has exceeded the threshold value (T-U), calculations of the degree of similarity are discontinued for the remaining frames to accelerate the processing.

In the step S23, it is checked whether the discrete time t, namely the current frame number, is coincident with the number of frames T. If the discrete time t is not coincident with the number of frames T (NO), the vector comparator 13 in a step S24 increments the discrete tine t and sets the component number i to 1 to then revert to the step S15. On the other hand, if the discrete time t is coincident with the number of frames T (YES), comparison of the totality of the feature vectors in the time series has finished. So, the time series comparator 14 in a step S25 outputs the ultimate number of similar vectors R and the average vector-to-vector distance sim/R to terminate the processing.

In the flowchart of FIG. 4, the processing for one feature vector time series $f_t$ is shown. In actuality, similar processing is repeated with a shift of one frame each time to detect all the signal positions in the input time domain signals F which are similar to the reference time domain signals G.

In the above-described similar signal detecting method, the information owned by the feature vectors are maintained unimpaired, such that, by infinitely enlarging the threshold value S, complete distance calculations can be achieved. In this case, the distance between the time domain signals which are the same as those of the full search method, may be output as the ultimate integrated value sim. Since the threshold value S can be set at the time of retrieval, the degree of freedom in setting the degree of similarity is high, thus assuring superior universality.

(3) Modification (3-1) Modification 1

In the above-described processing in the vector comparator 13, the distance threshold value S is set, and the integrating operation is discontinued if, in the course of the integrating operation, the integrated value sum has exceeded the threshold value S, in order to speed up the integrating operation. However, with this technique, from which vector component the retrieval is to be performed depends on the arraying sequence of the vector components, therefore, depending on this arraying sequence, there is produced a difference in the retrieving speed.

Thus, the feature vectors f, g in the feature vector time series $f_t$ and the feature vector time series $g_t$ are multiplied by an orthonormal transform matrix U, by way of performing orthogonal transform, as indicated by the following equations (2) and (3):

$$f'=Uf \quad (2)$$

$$g'=Ug \quad (3)$$

and, using the feature vectors g' and f', resulting from the orthogonal transform, integrating operation is carried out in the order of the falling significance, to achieve a further increase in the processing speed.

Meanwhile, as indicated by the following equation (4):

$$d^2=\|f'-g'\|^2=\|U(f-g)\|^2=(f-g)^t U^t U(f-g)=(f-g)^t(f-g)=\|f-g\|^2 \quad (4)$$

the square distance $d^2$ between two feature vectors g and f remains unchanged by the orthonormal transform matrix U.

Figure 5:
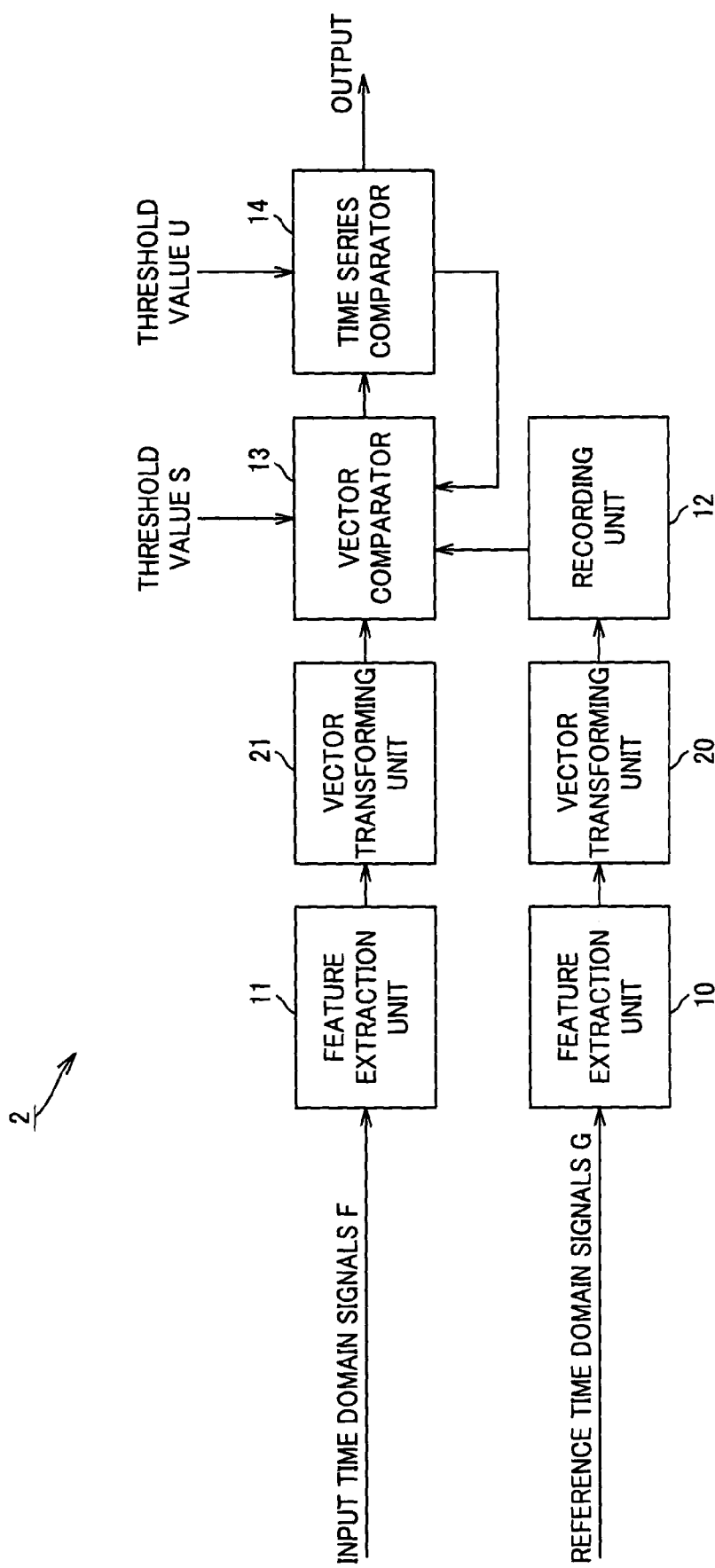
FIG. 5 illustrates the schematic structure of a similar signal detecting apparatus of a modified embodiment.

FIG. 5 shows the schematic structure of the similar vector detection apparatus in case of performing this vector transforming processing. The parts or components similar to those of the similar time series retrieving apparatus 1 are indicated by the same reference numerals and the corresponding explanation is omitted for simplicity. Referring to FIG. 5, a similar time series retrieving apparatus 2 is made up by feature extraction units 10, 11, vector transforming units 20, 21, a recording unit 12, a vector comparator 13 and a time series comparator 14. The vector transforming units 20, 21 perform similar transform processing on the feature vector f in the feature vector time series $f_t$ and on the feature vector g in the feature vector time series $g_t$, respectively.

In executing the registration in the similar time series retrieving apparatus 2, the feature extraction unit 10 extracts feature vector time series $g_t$ from the reference time domain signals G, while the vector transforming unit 20 performs orthogonal transform on the respective feature vectors g in the feature vector time series $g_t$ to generate feature vector time series $g'_t$. The recording unit 12 records the resulting transformed feature vector time series $g'_t$.

In executing the retrieval in the similar time series retrieving apparatus 2, the feature extraction unit 11 extracts feature vector time series $f_t$, as the subject-matter for comparison, from the input time domain signals F. The vector transforming unit 21 performs orthogonal transform on the feature vectors f in the feature vector time series $f_t$ to generate feature vector time series $f'_t$. The vector comparator 13 and the time series comparator 14 perform the processing similar to that described above, using the feature vector time series $f'_t$ and the feature vector time series $g'_t$, in order to detect signal positions in the input time domain signals F which are similar to the reference time domain signals G. It is noted that the vector comparator 13 performs integrating operation on the feature vectors f', g' in the feature vector time series $f'_t$ and the feature vector time series $g'_t$, in the order of the falling significance, as described above.

As the orthogonal transform matrix U, a variety of different matrices may be use. In the following, four specified instances are given by way of illustration.

(3-1-1) Specified example of the orthogonal transform

The simplest example of the sequential transform is the sequential matrix. This is simply the re-arraying of the sequence of the vector components. For example, the eight dimensional sequential matrix P is represented by the following equation (5):

$$P = \begin{bmatrix} 0 & 1 & 0 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 0 & 0 & 0 & 0 & 1 & 0 & 0 \\ 0 & 0 & 0 & 0 & 1 & 0 & 0 & 0 \\ 0 & 0 & 0 & 0 & 0 & 0 & 0 & 1 \\ 0 & 0 & 0 & 0 & 0 & 0 & 1 & 0 \end{bmatrix}. \quad (5)$$

It is noted that, if the distribution of the respective components of the feature vector f differs from that of the feature vector g, the components with a larger variance obviously contributes to the distance more significantly. Thus, in determining the re-arraying sequence, it is most proper to provide a sufficient number of (herein I) sample vectors $g_i$ and to set a sequential matrix in which the vectors are arrayed in the order of the decreasing variance vector V as calculated by the following equation (6):

$$V = \sum_{i=1}^{I} (g_i - \bar{g})^2, \; \bar{g} = \frac{1}{I}\sum_i g_i \quad (6)$$

Meanwhile, the orthogonal transform employing this sequential matrix is effective when the manner of spreading of the vector components differs. The operation may be accelerated since neither the multiplication/division nor the conditional branching is needed.

(3-1-2)

In case of feature values exhibiting high correlation between neighboring components, such as video or audio feature values, if the feature vectors are deemed to be discrete signals, the energy is offset in favor of the lower frequency components.

For this reason, the discrete cosine transform (DCT), represented by the following equations (7) and (8):

$$D = \begin{bmatrix} D_{11} & \cdots & D_{1N} \\ \vdots & \cdots & \vdots \\ D_{N1} & \cdots & D_{NN} \end{bmatrix} \quad (7)$$

$$D_{mn} = \alpha(m-1)\cos\frac{(m-1)(2n-1)\pi}{2N}, \alpha \begin{cases} \sqrt{\frac{1}{N}} & (n=1) \\ \sqrt{\frac{1}{N}} & (n \neq 1) \end{cases} \quad (8)$$

or the discrete Fourier transform (DFT), represented by the following equations (9) and (10):

$$F = \begin{bmatrix} F_{11} & \cdots & F_{1N} \\ \vdots & \cdots & \vdots \\ F_{N1} & \cdots & F_{NN} \end{bmatrix} \quad (9)$$

$$F_{mn} = \begin{cases} \sqrt{\frac{1}{N}} \cos\left(\frac{-2\pi(n/2-1)(m-1)}{N}\right) & (n:evennumber) \\ \sqrt{\frac{2}{N}} \sin\left(\frac{-2\pi((n+1)/2-N/2)(m-1)}{N}\right) & (n:oddnumber) \end{cases} \quad (10)$$

are used, and integration operation is executed sequentially from the low frequency component, whereby integration may be performed beginning from the more significant components to speed up the distance calculations between feature vectors.

For discrete cosine transform or discrete Fourier transform, fast transform methods, such as FFT (Fast Fourier transform), may be used. Moreover, it is unnecessary to hold all of the transform matrices, in a manner more favorable as to the memory consumption and the processing speed in implementing the processing by a computer than in case of calculating the totality of the matrices.

(3-1-3)

The Walsh-Hadamard transform is an orthogonal transform in which the respective elements of the transform matrix are formed only by ±1. This transform is convenient for fast transform because no multiplication is needed in transform. As the concept close to the frequency, the sequency is used, and the components are arrayed in the order of the rising sequency to enable fast distance calculations for vectors exhibiting high correlation between neighboring components, as in the case of the aforementioned discrete cosine transform or discrete Fourier transform.

The Walsh-Hadamard transform matrix is formed by the sign of the Fourier transform matrix or by recursive enlarging calculations of the matrix. As an example, the eight dimensional Walsh-Hadamard transform matrix W, in which the respective elements are arrayed in the order of the sequences, is shown by the following equation (11):

$$W = \frac{1}{\sqrt{8}} \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}. \quad (11)$$

(3-1-4)

If a sufficient number of sample vectors are collected in advance, and some sizeable cost may be allowed for the transform calculations, the Karhunen-Loeve transform, referred to below as KL transform, may be used conveniently as being optimum orthogonal transform.

The KL transform matrix T is a characteristic matrix for resolving the variance matrix V of sample vectors into characteristic values and, if the characteristic values are $\lambda_1, \ldots, \lambda_N$, the KL transform matrix T may be defined as indicated by the following equations (12):

$$V=T'\Lambda T, \Lambda=\text{diag}\{\lambda_1, \lambda_2, \ldots, \lambda_N\} \quad (12)$$

It is noted that the KL transform is an orthogonal transform which completely removes the correlation between the respective components. The variance of the transformed vector components become characteristic values $\lambda_i$. Thus, by constructing the KL transform matrix T so that the characteristic values $\lambda_j$ are arrayed in the order of the decreasing values, it is possible to integrate the distance from the axis of the maximum variance after integrating the totality of the components and eliminating the overlapping information.

With this technique employing the KL transform, the KL transform matrix T needs to be held for the entire dimensions, as a principle, while the matrix calculations for the totality of the dimensions need to be executed, thus raising the cost for calculations. However, these calculations are executed at the time of the registration, and hence do not increase the time needed in the retrieving processing which is in need of the high speed processing.

It is also possible to extract and hold only the vector components with a larger characteristic value and not to hold the vector components with a smaller characteristic value, in order to compress the vectors to reduce the storage area of the recording unit 12 (FIG. 5) or the data read-in time, although this may lead to certain deterioration in precision.

(4) Modification 2

In the above-described embodiment or modifications thereof, the retrieving processing is accelerated by the fast distance calculations between the feature vectors in each frame. However, the data read-in time from the recording unit 12 of e.g. the hard disc sometimes gives rise to increased overhead.

It should be noted that the KL transform in the above-described modification is the calculation of extracting main components making up the vector in the analysis method termed the main component analysis in the field of multi-variable analysis. In the modification, now explained, the main components of the such transformed vector g' are recorded as index vector $g_1$, while the remaining components are recorded as detail vector $g_2$. In retrieval, the index vector $g_1$ is first referenced to calculate the distance and, only when the results are less than the threshold value S, the detail vector $g_2$ is obtained and distance calculations are further carried out, thereby shortening the data read-in time.

Figure 6:
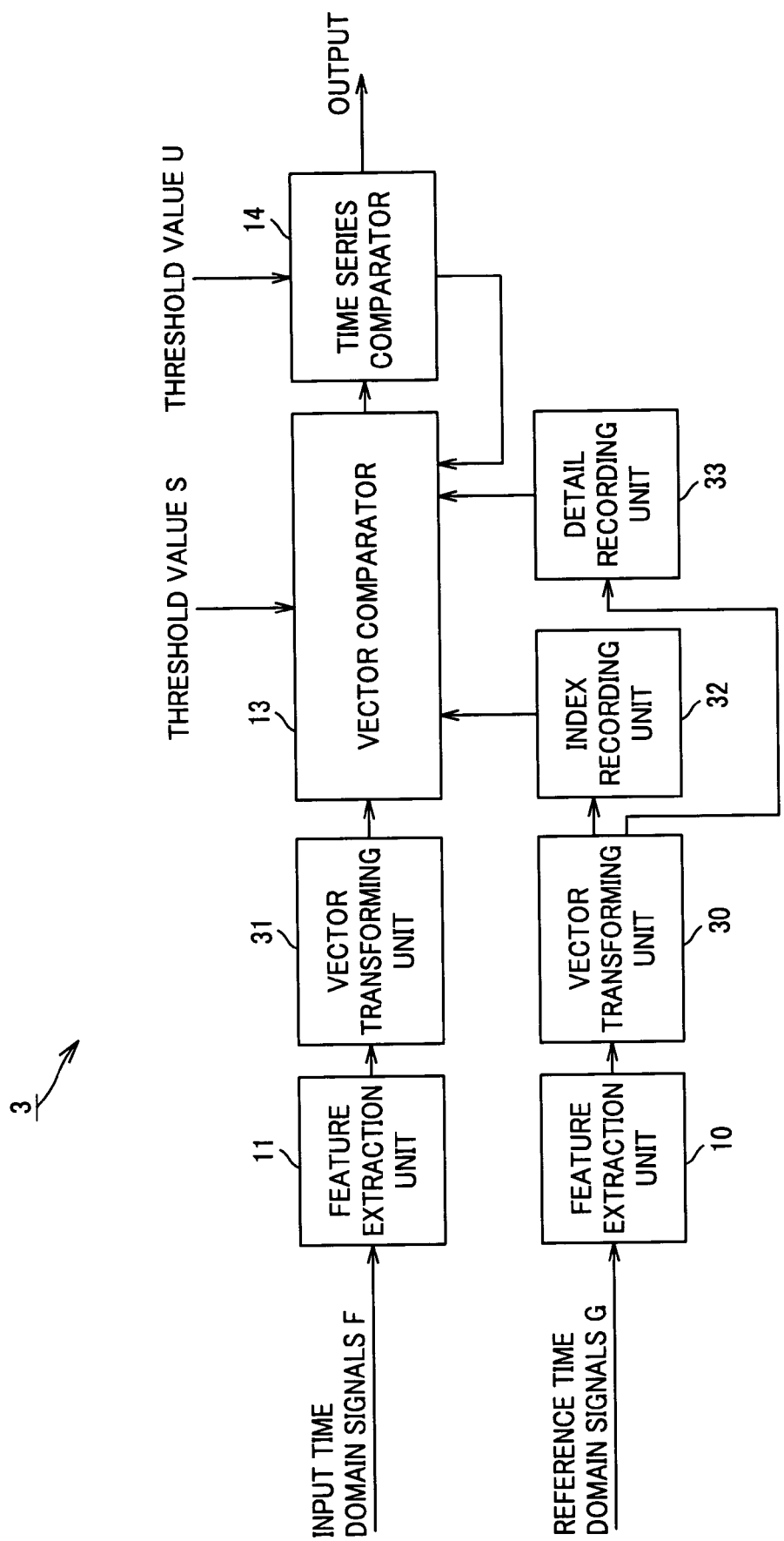
FIG. 6 illustrates the schematic structure of a similar signal detecting apparatus of a further modified embodiment.

FIG. 6 shows the schematic structure of a similar vector detecting apparatus for carrying out the above processing. The parts or components similar to those of the similar vector detecting apparatus 1, 2, shown in FIGS. 2 and 5, are depicted by the same reference numerals, and detailed description therefor is omitted for brevity. Referring to FIG. 6, the similar vector detecting apparatus 3 is made up by feature extraction units 10, 11, vector transforming units 30, 31, an index recording unit 32, a detail recording unit 33, a vector comparator 13 and a time series comparator 14. The index recording unit 32 and the detail recording unit 33 may, for example, be a magnetic disc, an optical disc or a semiconductor memory.

In registration by this similar vector detecting apparatus 3, the feature extraction unit 10 extracts the feature vector time series $g_t$ from the reference time domain signals G. The vector transforming unit 30 applies orthogonal transform to the respective feature vectors g in the feature vector time series $g_t$ to generate feature vector time series $g'_t$. Additionally, the vector transforming unit 30 splits the respective feature vectors g' in the feature vector time series $g'_t$ into an index vector $g_1$ made up by a preset number M ($1 \leq M < N$) components and a detail vector $g_2$ made up by the remaining components. The index recording unit 32 and the detail recording unit 33 record the index vector $g_1$ and the detail vector $g_2$, respectively.

In retrieval by the similar vector detecting apparatus 3, the feature extraction unit 11 extracts the feature vector time series $f_t$, as the subject-matter for comparison, from the input time domain signals F, while the vector transforming unit 31 applies orthogonal transform to the respective feature vectors f in the feature vector time series ft to generate feature vector time series $f'_t$. Additionally, the vector transforming unit 31 splits the respective feature vectors f' in the feature vector time series $f'_t$ into an index vector $f_1$ made up by a preset number M ($1 \leq M < N$) components and a detail vector $f_2$ made up by the remaining components. Using the feature vector time series $f'_t$ and the feature vector time series $g'_t$, the vector comparator 13 and the time series comparator 14 execute the processing similar to that described above to detect signal positions in the input time domain signals F analogous with the reference time domain signals G. It should be noted that the vector comparator 13 executes integrating operation on the respective index vectors $g_1$ in the feature vector time series $g'_t$ and on the respective index vectors $f_1$ in the feature vector time series f in the order of the falling significance and acquires the detail vectors $g_2$ and $f_2$ only when the integrated value sum obtained on integration of the M components is smaller than the threshold value S, to continue the integration.

In the present modification, neither the recording capacity nor the precision is changed as compared to the above-described embodiment or modifications. Moreover, the processing speed is also not changed. However, in such case where the majority of the comparison events are discarded in the comparing stage of the index vectors $g_1$, $f_1$ such that the acquisition of the detail vectors $g_2$ and $f_2$ becomes necessary only on rare occasions, the overhead by data accessing may be eliminated.

In the foregoing explanation, the as-transformed feature vectors are divided into index vectors and detail vectors. In a similar manner, the index vector may, of course, be further divided into a further upper order index vector and an index vector to provide a three-stage structure by way of providing a multi-stage structure.

(5) Extraction of Feature Vectors

The technique of extracting feature vector time series $a_t$, $v_t$ from the audio time domain signals A or video time domain signals V, as examples of the reference time domain signals G and input time domain signals F, by the feature extracting units 10, 11, is now explained. By extracting the audio feature vectors time series $a_t$ and/or the video feature vectors time series $v_t$, as later explained, and using these as feature vector time series $f_t$ and $g_t$, the signal positions in the unknown audio time domain signals A and/or the video time domain signals V analogous with the registered audio time domain signals A and/or video time domain signals V can be speedily retrieved, when these unknown signals are input, by exploiting the above-described technique.

(5-1) Extraction of audio feature vectors (5-1-1)

Figure 7:
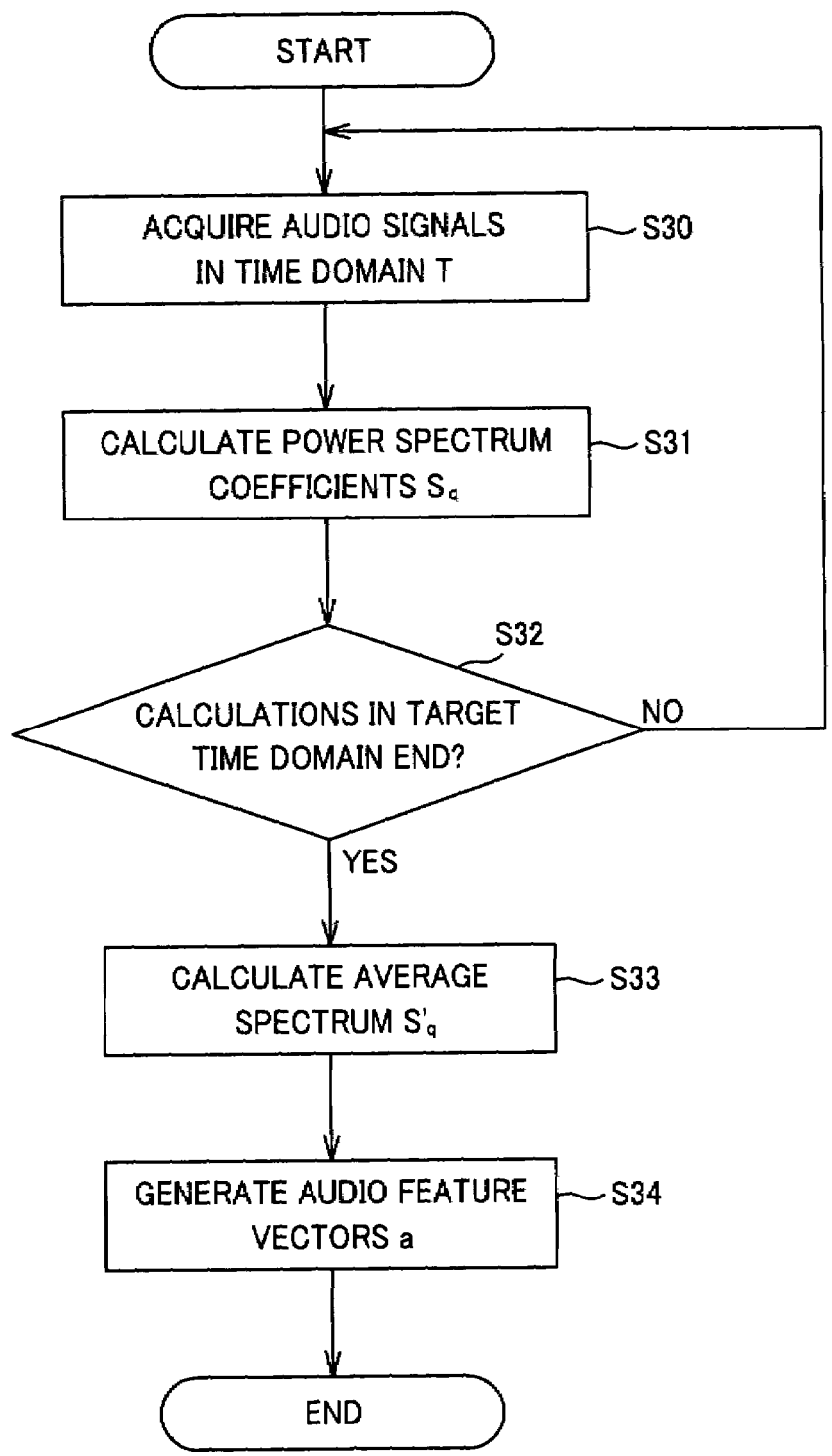
FIG. 7 is a flowchart for illustrating an exemplary operation of extracting an audio feature vector from audio signals.
Figure 8:
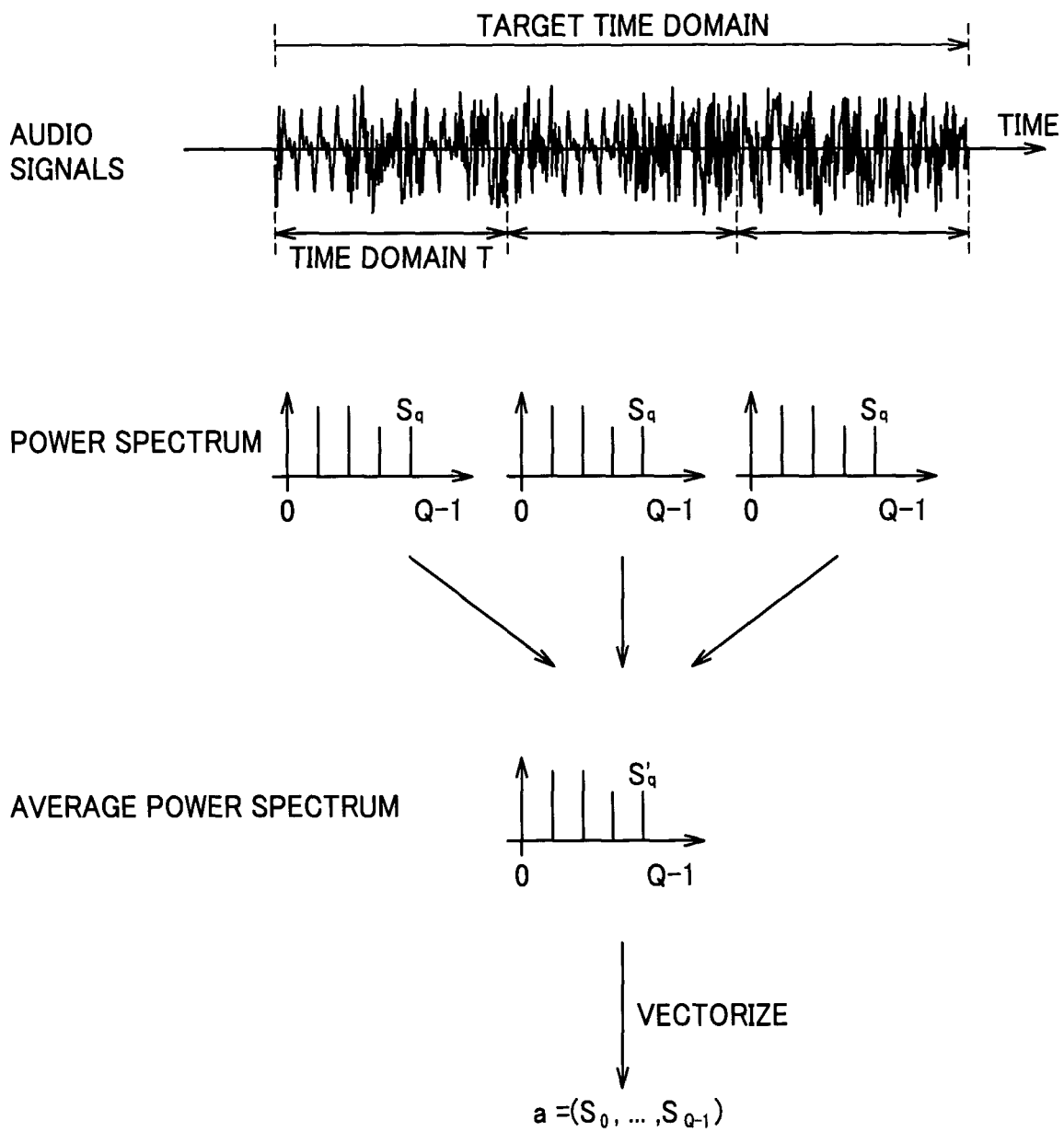
FIG. 8 illustrates the processing of extracting the audio feature vector from audio signals.

Referring to the flowchart of FIG. 7, and to FIG. 8, an instance of using power spectrum coefficients as feature values pertinent to audio signals is now explained. First, in a step S30, audio signals in a time domain T are acquired from the audio signals of the target time domain, as shown in FIG. 8.

In the next step S31, orthogonal transform, such as FFT, is applied to the acquired audio signals, to find power spectrum coefficients $S_q$ (q=0, 1, . . . Q-1), where q is an index indicating discrete frequency and Q is the maximum discrete frequency.

In the next step S32, it is checked whether or not calculations within the target time domain are finished. If the calculations are finished (YES), processing transfers to a step S33 and, if otherwise (NO), processing reverts to the step S30.

In the step S33, an average spectrum $S'_q$ of the power spectrum coefficients $S_q$, found as described above, is calculated. In a step S34, this average spectrum $S'_q$ is vectorized to generate audio feature vectors a. This audio feature vector a may be represented by for example the following equation (13):

$$a = (S_q, \ldots, S_{Q-1}) \quad (13)$$

This operation is sequentially repeatedly performed on the input audio time domain signals A, with a time shift for each repetition, so that, as the audio feature values, audio feature vector time series at (t=1, 2, . . . ), where t is an index indicating discrete time, are sequentially generated. The time shift may be such that neighboring time domains are slightly overlapped with one another.

In the above instance, the audio signals in the target time domain are partitioned every time domain T. Alternatively, when the target time domain is short, orthogonal transform may be applied without splitting the target time domain into respective time domains T.

In the foregoing, an instance of employing the power spectrum coefficients has been explained. This, however, is not limitative, such that cepstrum coefficients having an equivalent information may also be used. The linear prediction coefficients employing an AR (autoregressive) model may be used instead of employing Fourier transform to give comparable effects.

(5-1-2)

Since the audio signals are voluminous, these are mostly compressed by encoding for recording or transmission. The encoded audio time domain signals A may be decoded to baseband signals and subsequently the above technique may be used to extract the audio feature vector time series $a_t$.

However, if the audio feature vector time series at can be extracted solely by partial decoding, the extraction processing may be improved in efficiency and operating speed.

Figure 9:
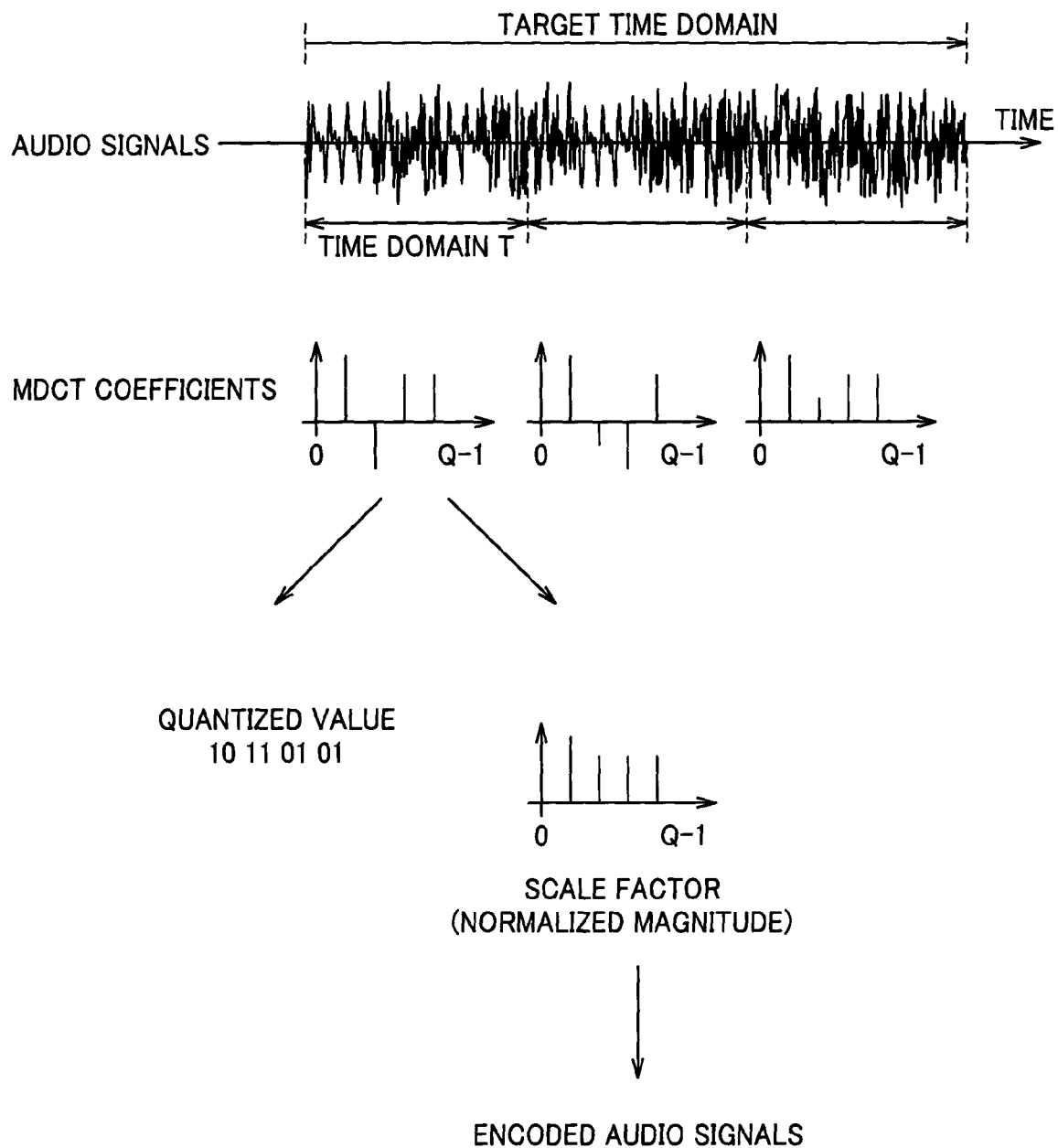
FIG. 9 illustrates transform coding in audio signals.

In the transform encoding, which is a routinely used encoding method, the input audio time domain signals A are partitioned into frames every time domain T as shown in FIG. 9. The orthogonal transform, such as modified discrete cosine transform (MDCT), is applied to the frame-based audio signals. The resulting coefficients are quantized and encoded. A scale factor, as a magnitude normalizing coefficient, is extracted from one frequency band to the next and separately encoded. Only these scale factors may be decoded and used as audio feature vectors a.

Figure 10:
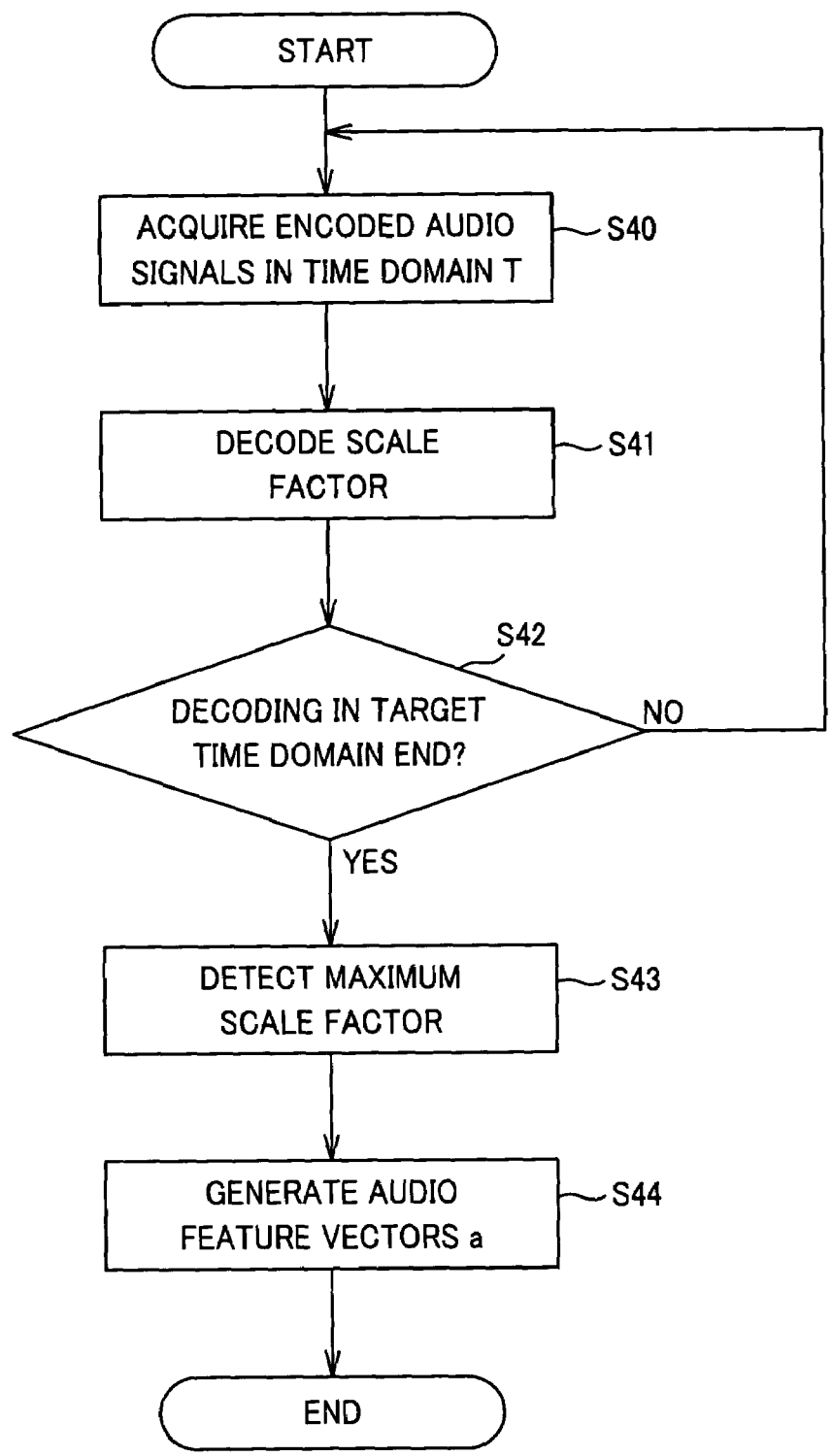
FIG. 10 is a flowchart for illustrating an exemplary operation of extracting an audio feature vector from encoded audio signals.
Figure 11:
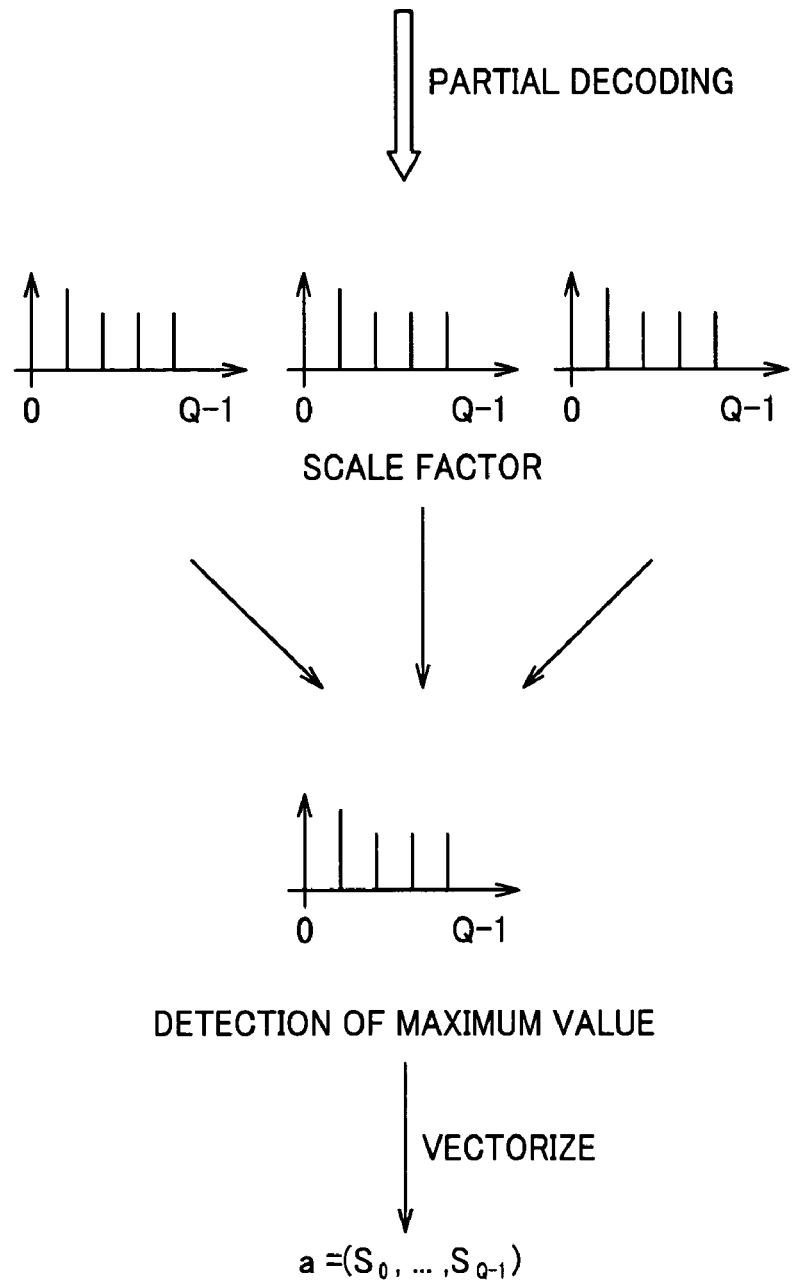
FIG. 11 illustrates the exemplary processing of extracting an audio feature vector from encoded audio signals.

An instance of employing the scale factor as a feature value pertinent to the audio signals is now explained by referring to the flowchart of FIG. 10 and to FIG. 11. First, in a step S40, encoded audio signals in the time domain T in the target time domain are acquired. In a step S41, the frame-based scale factors are partially decoded.

In the next step S42, it is checked whether or not the decoding in the target time domain has been finished. If the decoding has been finished (YES), processing transfers to a step S43 and, if otherwise (NO), processing reverts to the step S40.

In the step S43, the maximum scale factor is detected with respect to each band from the scale factors in the target time domain. In the step S44, these scale factors are vectorized to generate audio feature vectors a.

This operation is sequentially repeatedly performed on the encoded audio time domain signals, with a time shift of the time domain T for each repetition, so that, as audio feature values, audio feature vector time series $a_t$ (t=1, 2, . . . ), are sequentially generated. The time shift may be such that neighboring time domains T are slightly overlapped with one another. It is noted that t is an index indicating discrete time.

In this manner, the audio feature vectors at, equivalent to those described above, may be extracted speedily, without completely decoding the encoded audio signals.

(5-2) Extraction of Video Feature Vectors (5-2-1)

Figure 12:
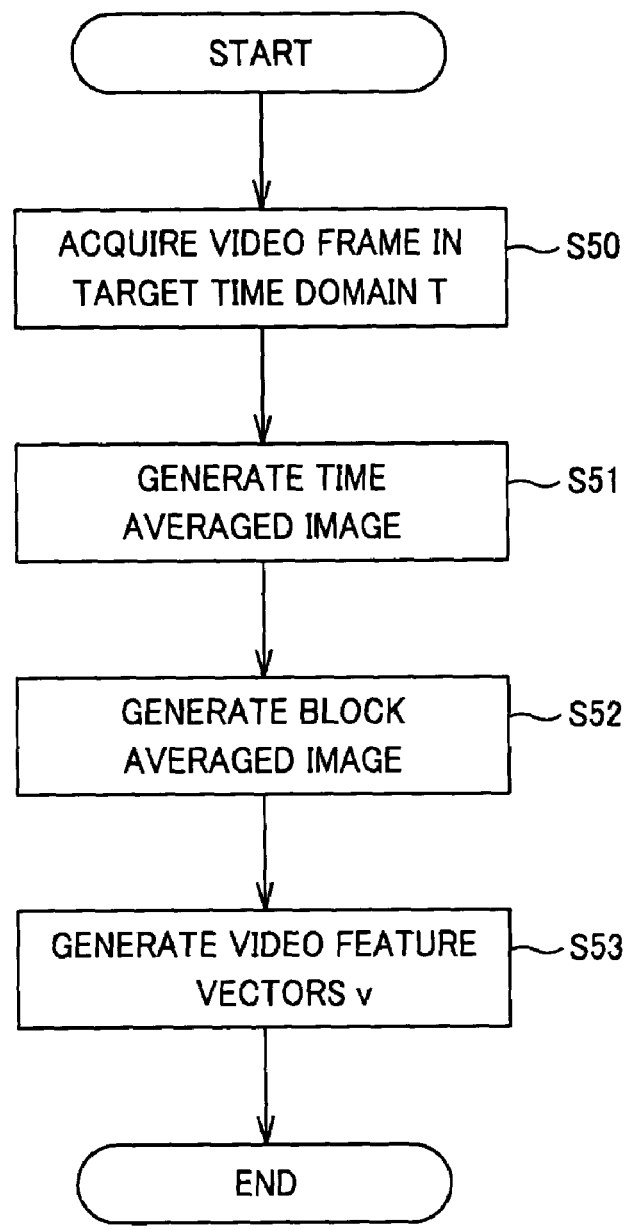
FIG. 12 is a flowchart for illustrating an exemplary processing of extracting the video feature vectors from video signals.
Figure 13:
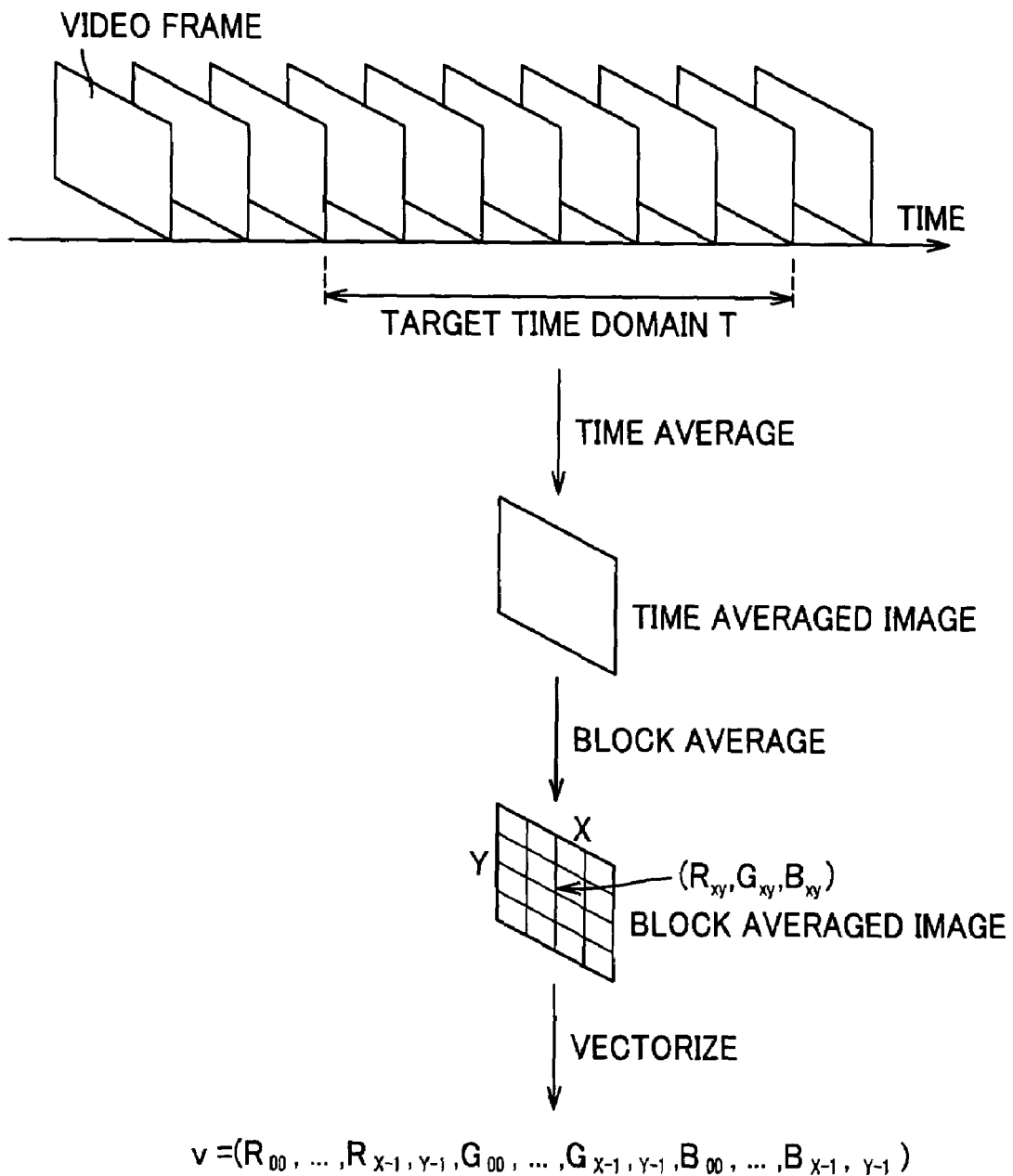
FIG. 13 illustrates exemplary processing of extracting video feature vectors from video signals.

An instance of employing the luminance information and the chroma information, as feature values pertinent to video signals, is explained by referring to the flowchart of FIG. 12 and to FIG. 13. First, in a step S50, a video frame is acquired from the video signals in the target time domain T, as shown in FIG. 13.

In the next step S51, a time averaged image is formed on the basis of all video frames acquired.

In the next step S52, the time averaged image formed is split into small X by Y blocks and a block averaged image then is prepared by averaging the pixel values in the respective blocks.

In a step S53, these blocks are arrayed in the order of R-G-B from for example the upper left towards the lower right to generate one-dimensional video feature vectors v. These video feature vectors v may, for example, be represented by the following equation (14):

$$v=(R_{00}, \ldots, R_{X-1,Y-1}, G_{00}, \ldots, G_{X-1,Y-1}, B_{00}, \ldots, B_{X-1,Y-1}) \quad (14)$$

This operation is sequentially repeatedly performed on the input video time domain signals V, with a time shift for each repetition, so that, as the video feature values, video feature vector time series $v_t$ (t=1, 2, . . . ), are sequentially generated. The time shift may be such that neighboring time domains are slightly overlapped with one another. It is noted that t is an index indicating discrete time.

The foregoing description is directed to an instance in which pixel values of the block averaged image obtained on splitting the time averaged image are re-arrayed to generate one-dimensional video feature vectors v. This, however, is not limitative, such that pixel values of the time averaged image may be re-arrayed without forming a block averaged image to generate one-dimensional video feature vectors v.

Moreover, taking into account that temporal changes of video signals are not so severe, one frame in the target time domain may be selected as a representative image, by way of substitution, without forming a time averaged image, for producing substantially the same results.

(5-2-2)

Even if video signals concerned are not identical, it is a frequent occurrence that images having analogous color distribution in their entirety, such as a studio image photographed from the same angle of the news image, are correlated in some way or other, such that there is a demand for retrieval under assuming that these images are identical images. In such case, it is effective to prepare a histogram for color distribution for comparison, with the exclusion of the space dependency of the image.

Figure 14:
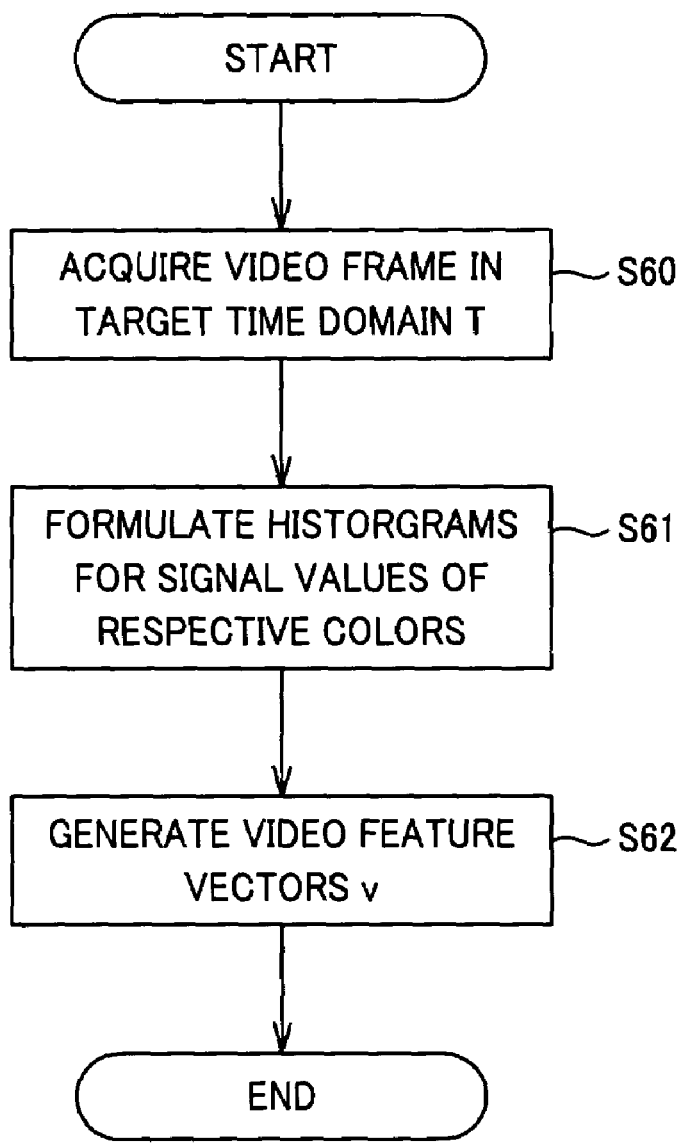
FIG. 14 is a flowchart for illustrating another exemplary processing of extracting video feature vectors from video signals.
Figure 15:
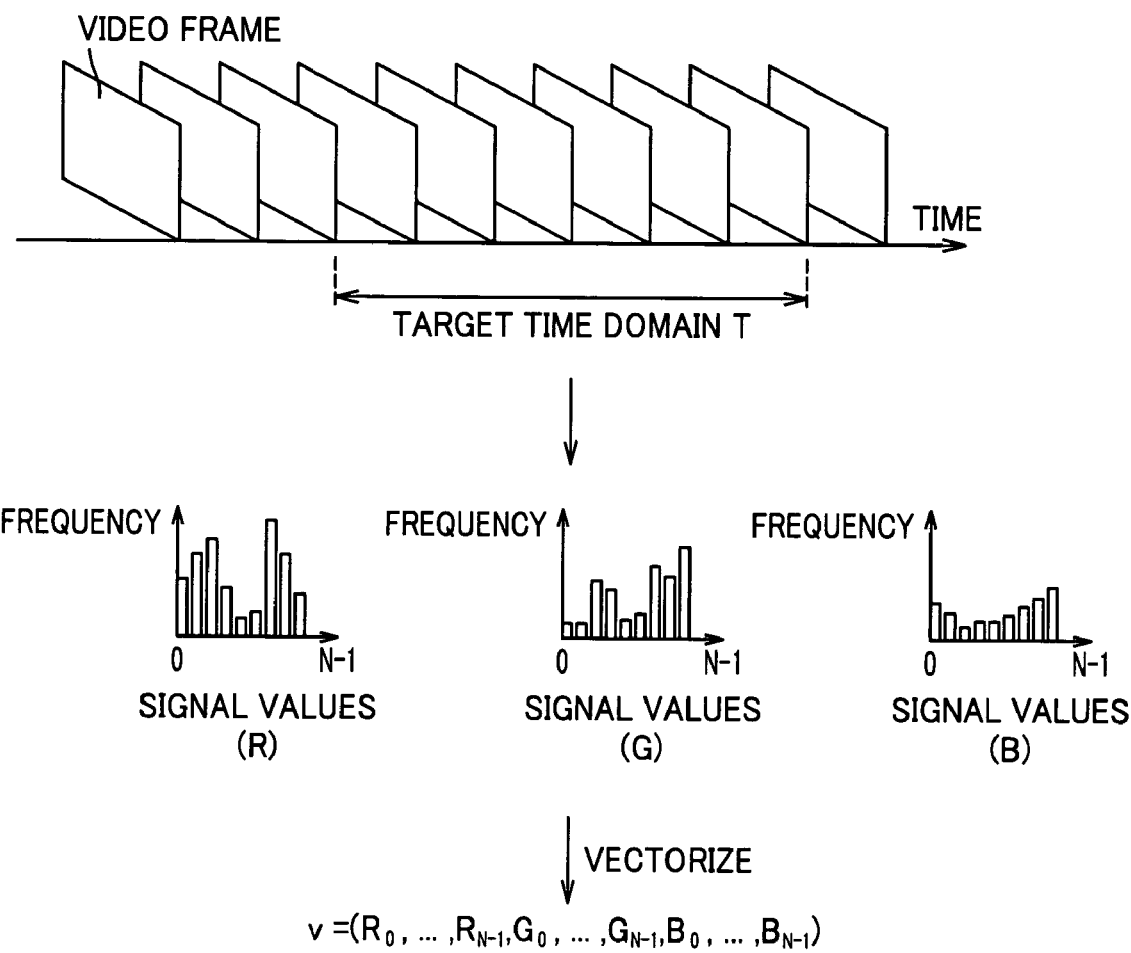
FIG. 15 illustrates another exemplary processing of extracting video feature vectors from video signals.

An instance of employing the color distribution histogram as characteristic value is now explained by referring to the flowchart of FIG. 14 and to FIG. 15. First, in a step S60, a video frame is acquired from video signals of the target time domain T, as shown in FIG. 15.

In the next step S61, a histogram for respective colors, for example, R, G and B, are prepared from signal values of the respective video frames.

In a step S62, the signal values are arrayed in the order of, for example, R, G and B, to generate one-dimensional video feature vectors v. These video feature vectors v may be represented by, for example, the following equation (15):

$$v=(R_0, \ldots, R_{N-1}, G_0, \ldots, G_{N-1}, B_0, \ldots, B_{N-1}) \quad (15)$$

This operation is sequentially repeatedly performed on the input video time domain signals V, with a time shift for each repetition, so that, as the video feature values, video feature vector time series $v_t$ (t=1, 2, ), are sequentially generated. The time shift may be such that neighboring time domains are slightly overlapped with one another. It is noted that t is an index indicating discrete time.

The foregoing description is directed to an instance in which the histogram for signal values of R, G and B is formulated. Alternatively, the histogram prepared may be that for signal values of luminance (Y) and that for signal values of chroma (Cb, Cr), whereby analogous effects may be achieved.

(5-2-3)

Since the video signals are voluminous, these are mostly compressed by encoding for recording or transmission. The encoded video time domain signals V may be decoded to baseband signals and subsequently the above technique may be used to extract the video feature vector time series $v_t$. However, the extraction processing may be improved in efficiency and operating speed if the video feature vector time series $v_t$ can be extracted solely by partial decoding.

Figure 16:
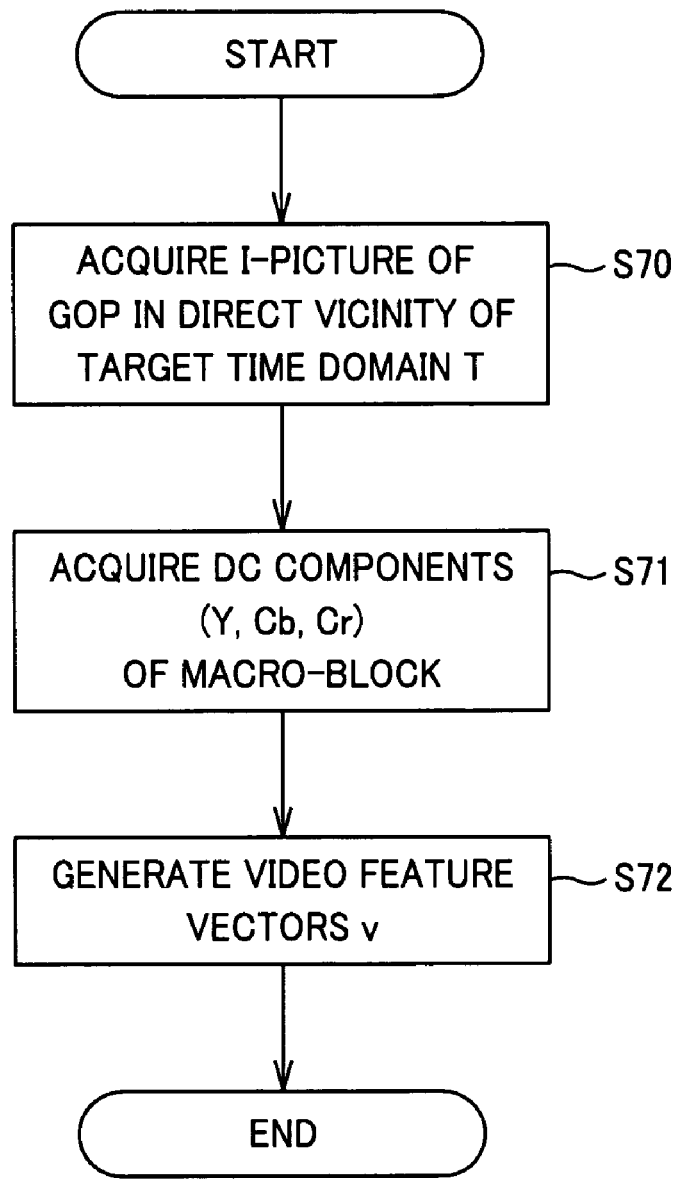
FIG. 16 is a flow chart for illustrating another exemplary processing of extracting video feature vectors from encoded video signals.
Figure 17:
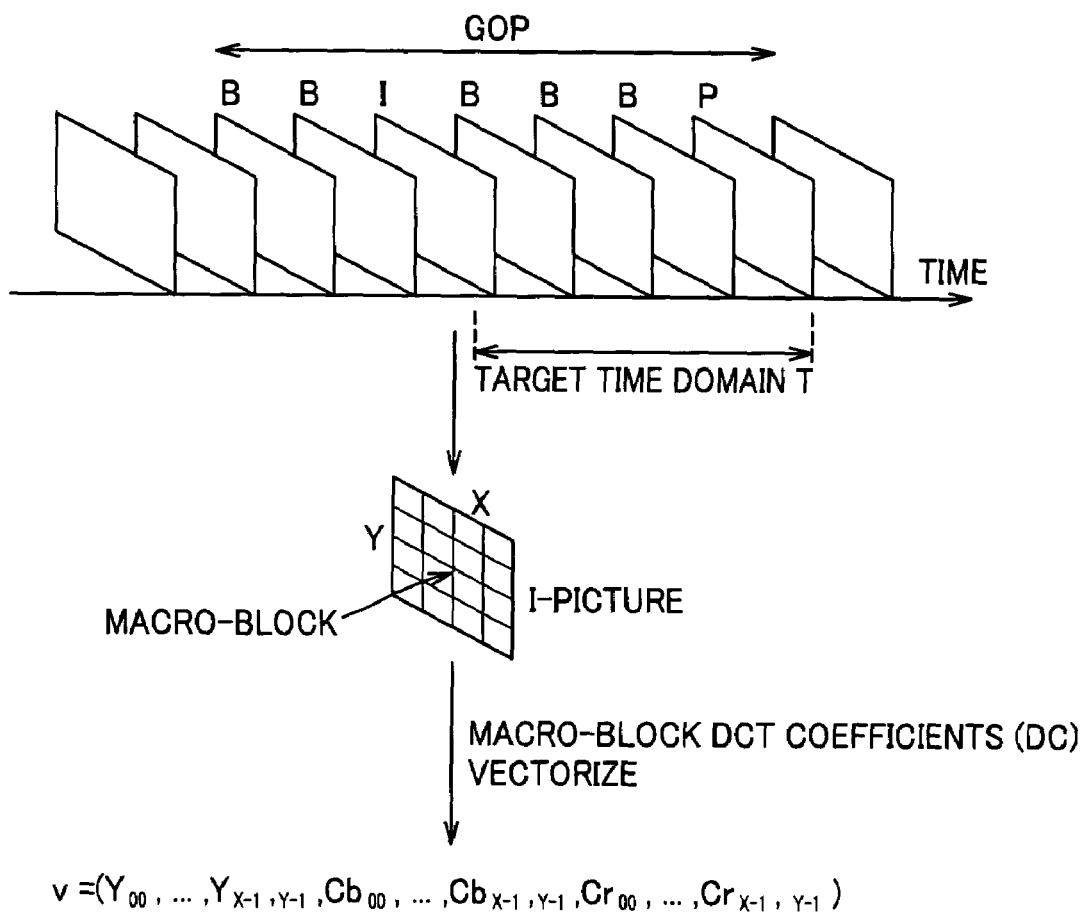
FIG. 17 illustrates another exemplary processing of extracting video feature vectors from encoded video signals.
Figure 18A:
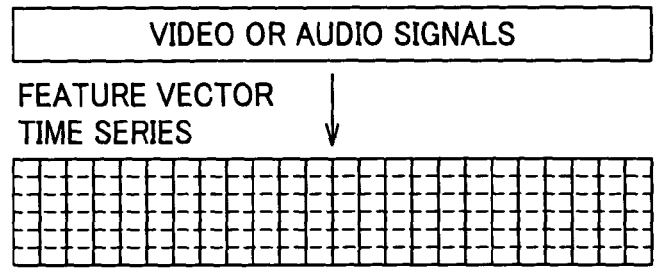
FIGS. 18A to 18D illustrate the conventional full search method, FIG. 18A showing the manner of generating the feature vectors from video or audio signals every frame of short duration and FIGS. 18B to 18D showing the manner of comparing the partial domains in the input time domain signals as to similarity to the reference time domain signals as the partial domains are sequentially shifted in time.
Figure 18B:
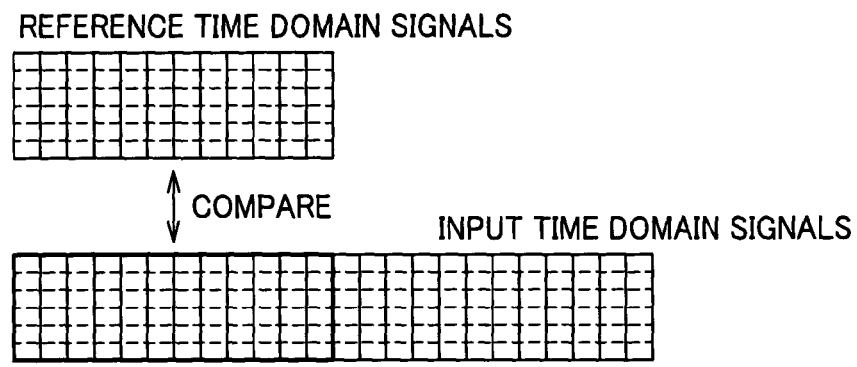
Figure 18C:
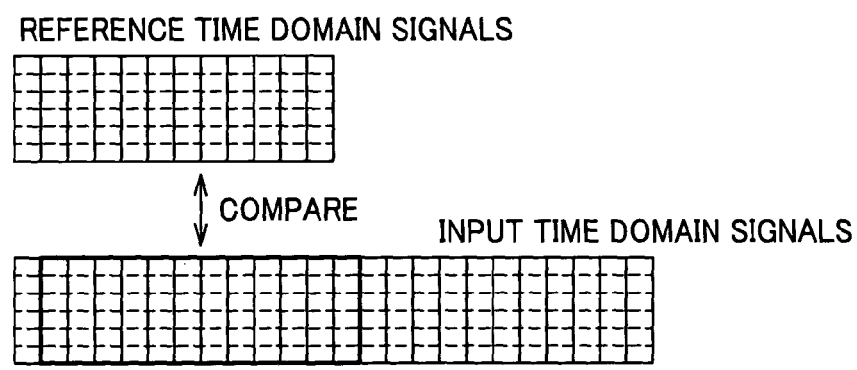
Figure 18D:
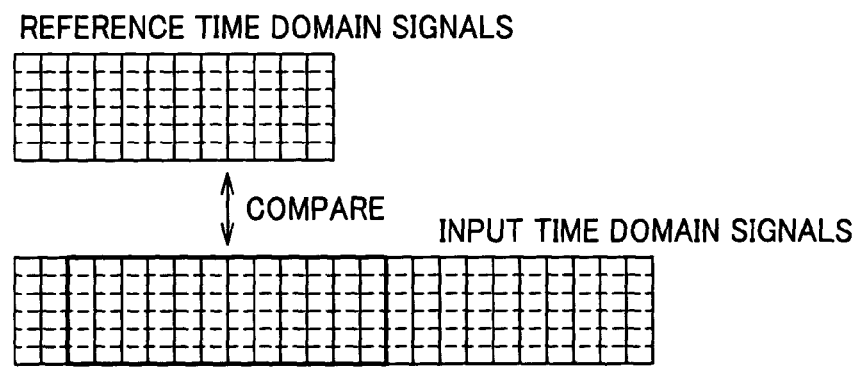
Figure 19:
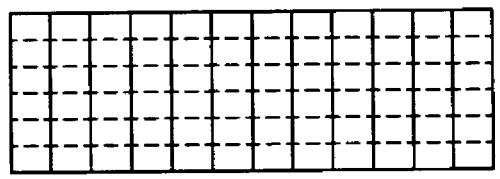
FIG. 19 shows that partially deteriorated feature vectors are inserted in the feature vector time domain signals of the input time domain signals.
Figure 19:
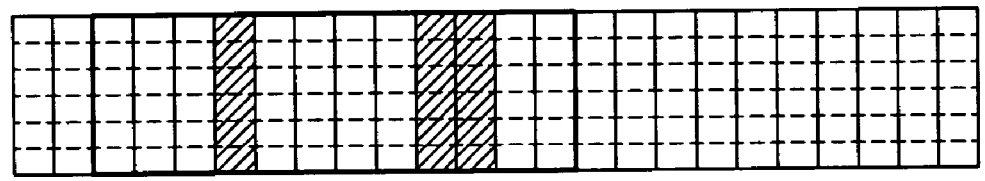

An instance in which the video feature vector time series $v_t$ are extracted from the video time domain signals V, encoded for compression in accordance with MPEG1 (Moving Picture Experts Group 1) or MPEG2, is now explained by referring to the flowchart of FIG. 16 and to FIG. 17. First, in a step S70, encoded picture signals of an encoded group of pictures (GOP), lying in direct proximity to the target time domain T adapted for vectorization, are acquired, and the intra-frame coded picture (I-picture) in the GOP is acquired.

It is noted that the frame picture has been encoded in terms of a macro-block (16×16 or 8×8 pixels) as a unit, and discrete cosine transform (DCT) is used. The DC coefficients resulting from DCT represent an average pixel value of the picture within the macro-block.

In a step S71, these DC coefficients are acquired. In the next step S72, the DC coefficients are arrayed in the order of, for example Y, Cb and Cr to generate one-dimensional video feature vectors v. These video feature vectors v may be expressed by for example the following equation (16):

$$v=(Y_{00}, \ldots, Y_{X-1,Y-1}, Cb_{00}, \ldots, Cb_{X-1,Y-1}, Cr_{00}, \ldots, Cr_{X-1,Y-1}) \quad (16).$$

This operation is sequentially repeatedly performed on the encoded video time domain signals V, with a time shift for each repetition, so that, as the video feature values, video feature vector time series $v_t$ (t=1,2, . . . ), are sequentially generated. The time shift may be such that neighboring time domains are slightly overlapped with one another. It is noted that t is an index indicating discrete time.

In this manner, the video feature vector time series $v_t$ may be speedily extracted without completely decoding the encoded video signals.

The foregoing description is directed to an instance in which the video time domain signals V used are those obtained on encoding with MPEG1 or MPEG2. However, the present invention may, of course, be applied to any other suitable compression encoding system.

(6) Others

The present invention may, of course, be modified by the skilled artisan by correction or substitution of the embodiments within the scope not departing from the purport of the invention.

For example, although the foregoing embodiment is directed to the hardware structure, this is not limitative, such that optional processing may be implemented by having the CPU (central processing unit) execute a computer program. In this case, the computer program may be provided as it is recorded on a recording medium, or may be provided as it is transmitted over the Internet or other transmission medium.

What is claimed is:

1. A method for detecting similar time series of a pair of time series patterns, with the time series patterns being a time series of vectors, said method comprising:
    a vector decision step of calculating a degree of similarity between a pair of vectors of said paired time series patterns and providing a decision as to whether or not said paired vectors are similar to each other, based on said degree of similarity; and
    a time series decision step of counting the number of similar vectors decided to be similar and/or dissimilar vectors decided to be dissimilar in said vector decision step and providing a decision as to whether or not the paired time series patterns are similar, based on the results of the counting,
    wherein,
    said degree of similarity is the distance between said paired vectors; and
    said vector decision step includes (a) a hierarchical distance calculating step of hierarchically calculating the distance between said paired vectors, (b) a threshold value comparing step of comparing an integrated distance value calculated in each hierarchy of said hierarchical distance calculating step to a first threshold value pertinent to the distance, and (c) a decision step of determining whether or not said paired vectors are similar to each other in response to the results of comparison in said threshold comparing step
    if, in said threshold comparing step, the integrated distance value calculated up to the last hierarchy is smaller than said first threshold value, said paired vectors are determined to be similar in said decision step, and
    if said integrated distance value calculated up to a given hierarchy exceeds said first threshold value, said paired vectors are determined to be dissimilar, and the distance calculations are discontinued for the remaining hierarchies.

2. The method for detecting similar time series according to claim 1, wherein,
    in said hierarchical distance calculating step, the distance between components making up the paired vectors is calculated hierarchically, and
    if, in said threshold comparing step, the integrated distance value calculated up to a given hierarchy is lower than the first threshold value, the next calculations of the distance between the components are carried out.

3. The method for detecting similar time series according to claim 2, wherein
    said vector decision step further includes a transform step of applying a preset transform to said paired vectors; and
    in said hierarchical distance calculating step, the distance between the paired vectors, transformed by said transform step, is calculated in a preset sequence which is based on said preset transform.

4. The method for detecting similar time series according to claim 3, wherein
    said preset transform is a transform of re-arraying said components making up said paired vectors in the order of the magnitudes of the variance of said components; and
    in said hierarchical distance calculating step, the distance between the paired vectors, transformed by said transform step, is calculated in the order of the decreasing magnitudes of the variance of the components.

5. The method for detecting similar time series according to claim 3, wherein
    said preset transform is the discrete cosine transform or the discrete Fourier transform; and
    in said hierarchical distance calculating step, the distance calculations between the paired vectors transformed by said transform step are carried out sequentially beginning from the low frequency components.

6. The method for detecting similar time series according to claim 3, wherein
    said preset transform is the Walsh-Hadamard transform; and
    in said hierarchical distance calculating step, the distance calculations between the paired vectors transformed by said transform step are carried out sequentially beginning from the low sequency components.

7. The method for detecting similar time series according to claim 3, wherein
    said preset transform is the Karhunen-Loeve transform; and
    in said hierarchical distance calculating step, the distance calculations between the paired vectors transformed by said transform step are carried out sequentially beginning from components of high characteristic value.

8. The method for detecting similar time series according to claim 3, wherein
said vector decision step further includes a splitting step of taking out components making up each of said paired vectors, transformed by said transform step, in said preset sequence, and splitting said component into a plurality of hierarchical partial vectors;
in said hierarchical distance calculating step, distance calculations between the respective components forming partial vectors are carried out hierarchically beginning from the partial vector of the uppermost hierarchy; and
when the integrated value of the distance calculated for the totality of the components making up the partial vectors up to a given hierarchy is lower than said first threshold value, the distance calculations between the components forming the partial vectors of the hierarchy lower by one hierarchy are carried out.

9. A method for detecting similar time series of a pair of time series patterns, with the time series patterns being time series of vectors, said method comprising:
a vector decision step of calculating a degree of similarity between a pair of vectors of said paired time series patterns and providing a decision as to whether or not said paired vectors are similar to each other, based on said degree of similarity; and
a time series decision step of counting the number of similar vectors decided to be similar and/or dissimilar vectors decided to be dissimilar in said vector decision step and providing a decision as to whether or not the paired time series patterns are similar, based on the results of the counting wherein,
said time series decision step includes (a) a hierarchical counting step of hierarchically counting the number of said similar vectors and/or said dissimilar vectors, (b) a threshold value comparing step of comparing an integrated value of the number of said similar vectors and/or said dissimilar vectors, obtained in each hierarchy of said hierarchical counting step, to a second threshold value of the number of similar vectors, and (c) a decision step of determining the similarity of said paired time series patterns, responsive to the results of comparison in said threshold value comparing step,
if, in said threshold value comparing step, the integrated value of the number of said similar vectors calculated up to the last hierarchy is larger than said second threshold value, said paired time series patterns are determined to be similar in said decision step,
if the integrated value of the number of the dissimilar vectors, calculated up to a given hierarchy, exceeds the total number of said vectors in said time series pattern less said second threshold value, said paired time series patterns are determined to be dissimilar, and control is performed to discontinue the calculations for the remaining hierarchies.

10. A method for detecting similar time series of a pair of time series patterns, with the time series patterns being time series of vectors, said method comprising:
a vector decision step of calculating a degree of similarity between a pair of vectors of said paired time series patterns and providing a decision as to whether or not said paired vectors are similar to each other, based on said degree of similarity; and
a time series decision step of counting the number of similar vectors decided to be similar and/or dissimilar vectors decided to be dissimilar in said vector decision step and providing a decision as to whether or not the paired time series patterns are similar, based on the results of the counting wherein,
said vector is the vectorized features of audio signals, and
said time series pattern is a time series of vectorized power spectrum coefficients in a preset time domain of said audio signals.

11. A method for detecting similar time series of a pair of time series patterns, with the time series patterns being time series of vectors, said method comprising:
a vector decision step of calculating a degree of similarity between a pair of vectors of said paired time series patterns and providing a decision as to whether or not said paired vectors are similar to each other, based on said degree of similarity; and
a time series decision step of counting the number of similar vectors decided to be similar and/or dissimilar vectors decided to be dissimilar in said vector decision step and providing a decision as to whether or not the paired time series patterns are similar, based on the results of the counting wherein,
said vector is the vectorized features of audio signals, and
said time series pattern is a time series of vectorized linear predictive coefficients in a preset time domain of said audio signals.

12. A method for detecting similar time series of a pair of time series patterns, with the time series patterns being time series of vectors, said method comprising:
a vector decision step of calculating a degree of similarity between a pair of vectors of said paired time series patterns and providing a decision as to whether or not said paired vectors are similar to each other, based on said degree of similarity; and
a time series decision step of counting the number of similar vectors decided to be similar and/or dissimilar vectors decided to be dissimilar in said vector decision step and providing a decision as to whether or not the paired time series patterns are similar, based on the results of the counting wherein,
said vector is the vectorized features of encoded audio signals, and
said time series pattern is a time series of vectorized parameters representing the intensity of the frequency components in each frame of said encoded audio signals.

13. A method for detecting similar time series of a pair of time series patterns, with the time series patterns being time series of vectors, said method comprising:
a vector decision step of calculating the degree of similarity between a pair of vectors of said paired time series patterns and providing a decision as to whether or not said paired vectors are similar to each other, based on said degree of similarity; and
a time series decision step of counting the number of similar vectors decided to be similar and/or dissimilar vectors decided to be dissimilar in said vector decision step and providing a decision as to whether or not the paired time series patterns are similar, based on the results of the counting wherein,
said vector is the vectorized features of video signals, and
said time series pattern is a time series of vectorized signal values of a representative picture in a preset time domain of said video signals, an average picture of frame pictures in said preset time domain or a small-sized picture, obtained on splitting said representative picture or said average picture in terms of a preset block as a unit.

14. A method for detecting similar time series of a pair of time series patterns, with the time series patterns being time series of vectors, said method comprising:
- a vector decision step of calculating the degree of similarity between a pair of vectors of said paired time series patterns and providing a decision as to whether or not said paired vectors are similar to each other, based on said degree of similarity; and
- a time series decision step of counting the number of similar vectors decided to be similar and/or dissimilar vectors decided to be dissimilar in said vector decision step and providing a decision as to whether or not the paired time series patterns are similar, based on the results of the counting wherein,
- said vector is the vectorized features of video signals, and
- said time series pattern is a time series of vectorized histograms for luminance and/or chroma in a frame picture in a preset time domain of said video signals.

15. A method for detecting similar time series of a pair of time series patterns, with the time series patterns being time series of vectors, said method comprising:
- a vector decision step of calculating the degree of similarity between a pair of vectors of said paired time series patterns and providing a decision as to whether or not said paired vectors are similar to each other, based on said degree of similarity; and
- a time series decision step of counting the number of similar vectors decided to be similar and/or dissimilar vectors decided to be dissimilar in said vector decision step and providing a decision as to whether or not the paired time series patterns are similar, based on the results of the counting wherein,
- said vector is the vectorized features of encoded video signals, and
- said time series pattern is a time series of vectorized signal values of DC components of respective blocks as encoding units of an intra-frame encoded picture in direct proximity of a preset time domain of said encoded video signals.

16. A method for detecting similar time series of a pair of time series patterns, with the time series patterns being time series of vectors, said method comprising:
- a vector decision step of calculating the degree of similarity between a pair of vectors of said paired time series patterns and providing a decision as to whether or not said paired vectors are similar to each other, based on said degree of similarity; and
- a time series decision step of counting the number of similar vectors decided to be similar and/or dissimilar vectors decided to be dissimilar in said vector decision step and providing a decision as to whether or not the paired time series patterns are similar, based on the results of the counting wherein,
- one of said paired time series patterns is sliced from a time series of a vector longer than said time series patterns and wherein similarity is sequentially checked as the slicing position is updated.

17. An apparatus for detecting similar time series of a pair of time series patterns, with the time series patterns being time series of vectors, said apparatus comprising:
- vector decision means for calculating the degree of similarity between a pair of vectors of said paired time series patterns and providing a decision as to whether or not said paired vectors are similar to each other, based on said degree of similarity; and
- time series decision means for counting the number of similar vectors decided to be similar and/or dissimilar vectors decided to be dissimilar in said vector decision means and providing a decision as to whether or not the paired time series patterns are similar, based on the results of the counting wherein,
- said vector decision means includes (a) hierarchical distance calculating means for hierarchically calculating the distance between said paired vectors, (b) threshold value comparing means for comparing an integrated distance value calculated in each hierarchy of said hierarchical distance calculating means to a first threshold value pertinent to the distance, and (c) decision means for determining whether or not said paired vectors are similar to each other, responsive to the results of comparison in said threshold comparing means
- said degree of similarity is the distance between said paired vectors, and
- said decision means being configured such that, if, as a result of comparison by said threshold comparing means, the integrated distance value calculated up to the last hierarchy is smaller than said first threshold value, said paired vectors are determined to be similar, and
- if an integrated distance value calculated up to a given hierarchy exceeds said first threshold value, said paired vectors are determined to be dissimilar, and the distance calculations for the remaining hierarchies is ended.

18. The apparatus for detecting similar time series according to claim 17 wherein
- said hierarchical distance calculating is means configured to calculate the distance between components making up the paired vectors hierarchically, and
- if, as a result of comparison by said threshold comparing means, the integrated distance value calculated up to a given hierarchy is lower than the first threshold value, the next calculations of the distance between the components are carried out.

19. The apparatus for detecting similar time series according to claim 18, wherein
- said vector decision means further includes a transform means for applying a preset transform to said paired vectors, and
- said hierarchical distance calculating means is configured to calculate the distance between the paired vectors, transformed by said transform means, in a preset sequence which is based on said preset transform.

20. The apparatus for detecting similar time series according to claim 19, wherein
- said vector decision means further includes splitting means for taking out components making up each of said paired vectors, transformed by said transform means, in said preset sequence, and splitting said components into a plurality of hierarchical partial vectors,
- said hierarchical distance calculating means is configured to execute distance calculations between the respective components forming partial vectors hierarchically beginning from the partial vector of the uppermost hierarchy, and
- the distance calculations between the components forming the partial vectors of the hierarchy lower by one hierarchy are carried out when the integrated value of the distance calculated for the totality of the components making up the partial vectors up to a given hierarchy is lower than said first threshold value.

21. An apparatus for detecting similar time series of a pair of time series patterns, with the time series patterns being time series of vectors, said apparatus comprising:

vector decision means for calculating the degree of similarity between a pair of vectors of said paired time series patterns and providing a decision as to whether or not said paired vectors are similar to each other, based on said degree of similarity; and time series decision means for counting the number of similar vectors decided to be similar and/or dissimilar vectors decided to be dissimilar in said vector decision means and providing a decision as to whether or not the paired time series patterns are similar, based on the results of the counting, wherein, said time series decision means includes (a) hierarchical counting means for hierarchically counting the number of said similar vectors and/or said dissimilar vectors, (b) threshold value comparing means for comparing an integrated value of the number of said similar vectors and/or said dissimilar vectors, obtained in each hierarchy of said hierarchical counting means, to a second threshold value of the number of similar vectors, and (c) decision means for determining the similarity of said paired time series patterns, responsive to the results of comparison in said threshold value comparing means, if, as a result of comparison by said threshold value comparing means, the integrated value of the number of said similar vectors calculated up to the last hierarchy is larger than said second threshold value, said decision means determines the paired time series patterns to be similar, and if the integrated value of the number of the dissimilar vectors, calculated up to a given hierarchy, exceeds the total number of said vectors in said time series pattern less said second threshold value, said decision means determines the paired time series patterns to be dissimilar, and control is performed to discontinue the distance calculations for the remaining hierarchies.

22. A program for having a computer execute the processing of detecting similar time series of a pair of time series patterns, with the time series patterns being time series of vectors, said program comprising:

a vector decision step of calculating the degree of similarity between a pair of vectors of said paired time series patterns and providing a decision as to whether or not said paired vectors are similar to each other, based on said degree of similarity; and a time series decision step of counting the number of similar vectors decided to be similar and/or dissimilar vectors decided to be dissimilar in said vector decision step and providing a decision as to whether or not the paired time series patterns are similar, based on the results of the counting wherein, said degree of similarity is the distance between said paired vectors, said vector decision step includes (a) a hierarchical distance calculating step of hierarchically calculating the distance between said paired vectors, (b) a threshold value comparing step of comparing an integrated distance value calculated in each hierarchy of said hierarchical distance calculating step to a first threshold value pertinent to the distance and (c) a decision step of determining whether or not said paired vectors are similar to each other, responsive to the results of comparison in said threshold comparing step;

if, in said threshold comparing step, the integrated distance value calculated up to the last hierarchy is smaller than said first threshold value, said paired vectors are determined to be similar in said decision step, and if an integrated distance value calculated up to a given hierarchy exceeds said first threshold value, said paired vectors are determined to be dissimilar, and control is performed to discontinue the distance calculations for the remaining hierarchies.

23. The program for detecting similar time series according to claim 22, wherein, in said hierarchical distance calculating step, the distance between components making up the paired vectors is calculated hierarchically; and, if, in said threshold comparing step, the integrated distance value calculated up to a given hierarchy is lower than the first threshold value, the next calculations of the distance between the components are carried out.

24. The program for detecting similar time series according to claim 23, wherein said vector decision step further includes a transform step of applying a preset transform to said paired vectors; and in said hierarchical distance calculating step, the distance between the paired vectors, transformed by said transform step, is calculated in a preset sequence which is based on said preset transform.

25. The program for detecting similar time series according to claim 24, wherein said vector decision step further includes a splitting step of taking out components making up each of said paired vectors, transformed by said transform step, in said preset sequence, and splitting said component into a plurality of hierarchical partial vectors; and in said hierarchical distance calculating step, distance calculations between the respective components forming partial vectors are carried out hierarchically beginning from the partial vector of the uppermost hierarchy; when the integrated value of the distance calculated for the totality of the components making up the partial vectors up to a given hierarchy is lower than said first threshold value, the distance calculations between the components forming the partial vectors of the hierarchy lower by one hierarchy are carried out.

26. A program for having a computer execute the processing of detecting similar time series of a pair of time series patterns, with the time series patterns being time series of vectors, said program comprising:

a vector decision step of calculating the degree of similarity between a pair of vectors of said paired time series patterns and providing a decision as to whether or not said paired vectors are similar to each other, based on said degree of similarity; and a time series decision step of counting the number of similar vectors decided to be similar and/or dissimilar vectors decided to be dissimilar in said vector decision step and providing a decision as to whether or not the paired time series patterns are similar, based on the results of the counting wherein, said time series decision step includes (a) a hierarchical counting step of hierarchically counting the number of said similar vectors and/or said dissimilar vectors, (b) a threshold value comparing step of comparing an integrated value of the number of said similar vectors and/or said dissimilar vectors, obtained in each hierarchy of said hierarchical counting step, to a second threshold value of the number of similar vectors, and (c) a decision step of determining the similarity of said paired time series patterns, responsive to the results of comparison in said threshold value comparing step, if, in said threshold value comparing step, the integrated value of the number of said similar vectors calculated up to the last hierarchy is larger than said second threshold value, said paired time series patterns are determined to be similar in said decision step, and if the integrated value of the number of the dissimilar vectors, calculated up to a given hierarchy, exceeds the total number of said vectors in said time series pattern less said second threshold value, said paired time series patterns are determined to be dissimilar, and control is performed to discontinue the calculations for the remaining hierarchies.

27. A computer-controllable recording medium having recorded thereon a program for having a computer execute the processing of detecting similar time series of a pair of time series patterns, with the time series patterns being time series of vectors, said program comprising:

a vector decision step of calculating the degree of similarity between a pair of vectors of said paired time series patterns and providing a decision as to whether or not said paired vectors are similar to each other, based on said degree of similarity; and a time series decision step of counting the number of similar vectors decided to be similar and/or dissimilar vectors decided to be dissimilar in said vector decision step and providing a decision as to whether or not the paired time series patterns are similar, based on the results of the counting wherein, said degree of similarity is the distance between said paired vectors, said vector decision step includes (a) a hierarchical distance calculating step of hierarchically calculating the distance between said paired vectors, (b) a threshold value comparing step of comparing an integrated distance value calculated in each hierarchy of said hierarchical distance calculating step to a first threshold value pertinent to the distances and (c) a decision step of determining whether or not said paired vectors are similar to each other, responsive to the results of comparison in said threshold comparing step;

if, in said threshold comparing step, the integrated distance value calculated up to the last hierarchy is smaller than said first threshold value, said paired vectors are determined to be similar in said decision step, and if an integrated distance value calculated up to a given hierarchy exceeds said first threshold value, said paired vectors are determined to be dissimilar, and control is performed to discontinue the distance calculations for the remaining hierarchies.

28. The recording medium according to claim 27, wherein, in said hierarchical distance calculating step, the distance between components making up the paired vectors is calculated hierarchically, and if, in said threshold comparing step, the integrated distance value calculated up to a given hierarchy is lower than the first threshold value, the next calculations of the distance between the components are carried out.

29. The recording medium according to claim 27, wherein said vector decision step further includes a transform step of applying a preset transform to said paired vectors; and in said hierarchical distance calculating step, the distance between the paired vectors, transformed by said transform step, is calculated in a preset sequence which is based on said preset transform.

30. The recording medium according to claim 29, wherein said vector decision step further includes a splitting step of taking out components making up each of said paired vectors, transformed by said transform step, in said preset sequence, and splitting said component into a plurality of hierarchical partial vectors; and in said hierarchical distance calculating step, distance calculations between the respective components forming partial vectors are carried out hierarchically beginning from the partial vector of the uppermost hierarchy; when the integrated value of the distance calculated for the totality of the components making up the partial vectors up to a given hierarchy is lower than said first threshold value, the distance calculations between the components forming the partial vectors of the hierarchy lower by one hierarchy are carried out.

31. A computer-controllable recording medium having recorded thereon a program for having a computer execute the processing of detecting similar time series of a pair of time series patterns, with the time series patterns being time series of vectors, said program comprising: a vector decision step of calculating the degree of similarity between a pair of vectors of said paired time series patterns and providing a decision as to whether or not said paired vectors are similar to each other, based on said degree of similarity; and a time series decision step of counting the number of similar vectors decided to be similar and/or dissimilar vectors decided to be dissimilar in said vector decision step and providing a decision as to whether or not the paired time series patterns are similar, based on the results of the counting wherein, said time series decision step includes (a) a hierarchical counting step of hierarchically counting the number of said similar vectors and/or said dissimilar vectors, (b) a threshold value comparing step of comparing an integrated value of the number of said similar vectors and/or said dissimilar vectors, obtained in each hierarchy of said hierarchical counting step, to a second threshold value of the number of similar vectors, and (c) a decision step of determining the similarity of said paired time series patterns, responsive to the results of comparison in said threshold value comparing step, if, in said threshold value comparing step, the integrated value of the number of said similar vectors calculated up to the last hierarchy is larger than said second threshold value, said paired time series patterns are determined to be similar in said decision step, and if the integrated value of the number of the dissimilar vectors, calculated up to a given hierarchy, exceeds the total number of said vectors in said time series pattern less said second threshold value, said paired time series patterns are determined to be dissimilar, and control is performed to discontinue the calculations for the remaining hierarchies.

* * * * *